United States Patent

[11] 3,596,153

[72] Inventors Wallace E. Brainard
 New Berlin;
 Edward E. Kirkham, Brookfield, both of, Wis.
[21] Appl. No. 755,206
[22] Filed Aug. 26, 1968
[45] Patented July 27, 1971
[73] Assignee Kearney & Trecker Corporation
 West Allis, Wis.

[54] POSITIONAL CONTROL SYSTEM FOR A MACHINE TOOL
 16 Claims, 9 Drawing Figs.
[52] U.S. Cl. .................................................... 318/574,
 318/640, 235/151.11
[51] Int. Cl. ................................................ G05b 19/100
[50] Field of Search .......................................... 235/151.11;
 318/18—33

[56] References Cited
UNITED STATES PATENTS
3,206,857 9/1965 Kaye .......................... 235/151.11 UX Primary Examiner—Benjamin Dobeck
Attorneys—Donald E. Porter and William C. Gleisner, Jr.

ABSTRACT: This invention relates to a vector measurement system for controlling positional movement of a machine tool spindle along two mutually perpendicular axes respectively perpendicular to the axis of spindle rotation. The spindle is journaled in a spindlehead vertically movable on a column that is horizontally movable on a supporting base. Separate power translators are respectively connected to effect horizontal column movement and vertical spindlehead movement in accordance with separate feedback error control signals. A pair of separate lineal measuring instruments which are pivotally secured at one end to the spindle, extend in angularly diverging directions and are pivotally secured at their opposite outer ends to spaced apart portions of the support base. A positional control system responsive to vector measurements from both diagonally disposed, pivotally interconnected lineal measuring transducers provides separate feedback error control signals for indicating the spindle position along its respective horizontal and vertical axes. Predetermined digital input command signals actuate the separate power translators for moving the tool spindle horizontally and vertically to a position determined by positional error feedback signals from the vector measurement control system. In a similar manner, error feedback signals from the vector measurement control system operate to control bodily movement of the tool spindle along only one axis of movement. During each single axis movement, rectilinear positional measurement signals from both pivotally interconnected vector measuring transducers are connected to provide orthogonal positional error control signals.

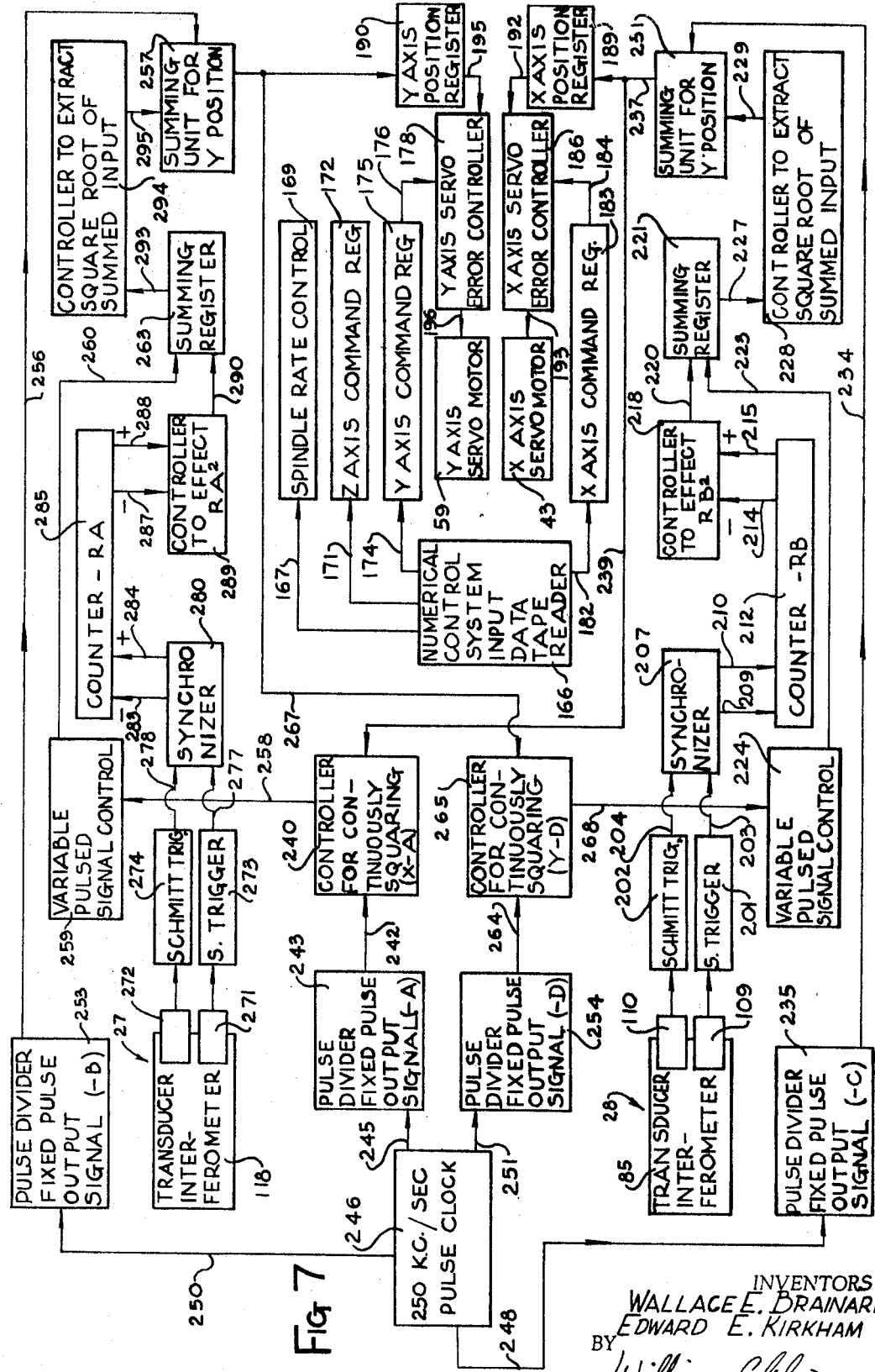

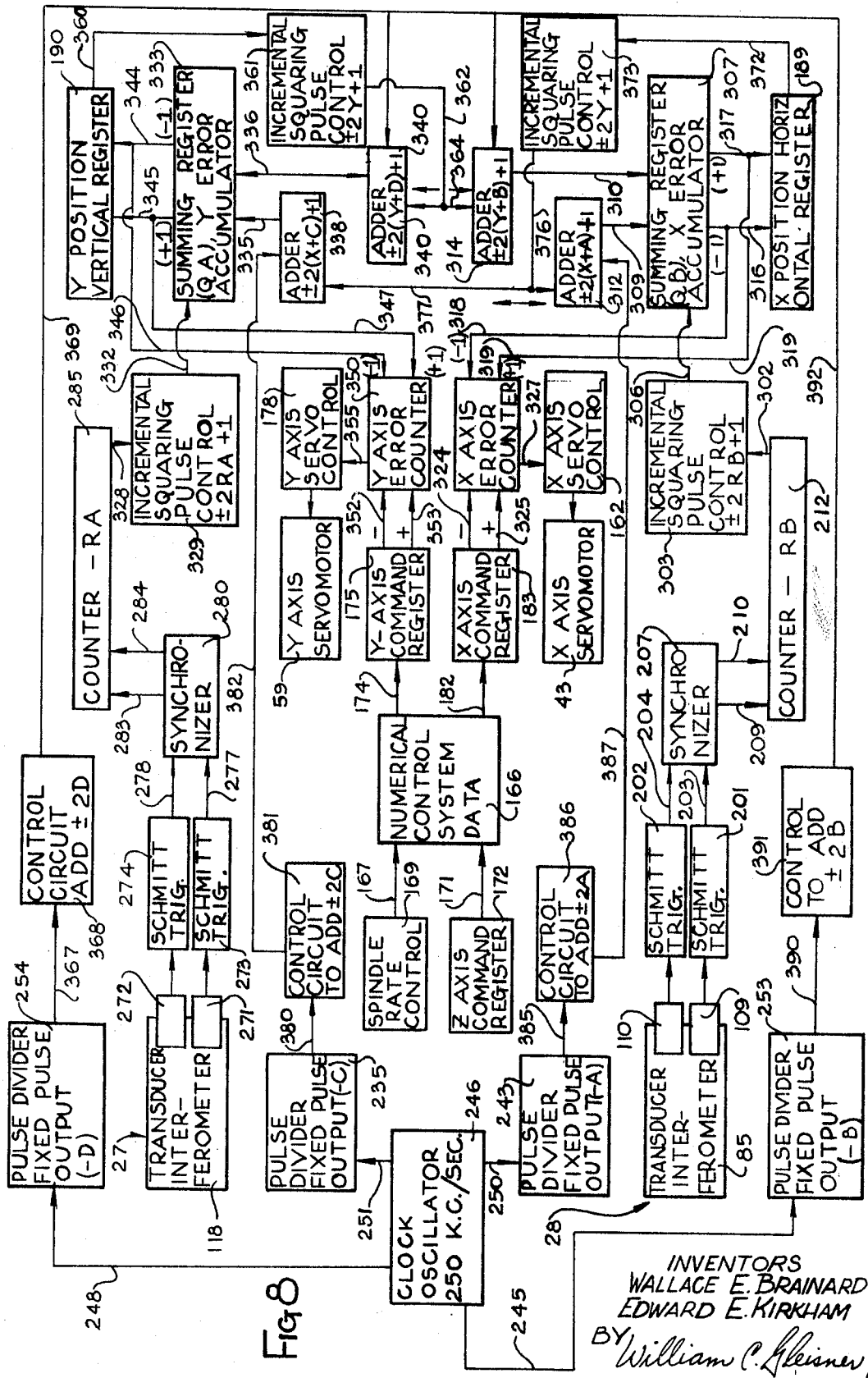

POSITIONAL CONTROL SYSTEM FOR A MACHINE TOOL

BACKGROUND OF THE INVENTION

In prior machine tools and control systems therefor separate rectilinear transducers are adapted to control orthogonal movements along axes in fixed parallelism to the respective transducers. For example, a rectilinear transducer scale horizontally affixed to a support base is disposed to cooperate with an electrical positioning reading head secured to a column horizontally movable along the base. Thus, the horizontal transducer directly provides a positional feedback error signal for controlling horizontal movement of the column and a tool spindle carried thereby along the base. In a similar manner, a rectilinear transducer scale vertically affixed to the column coacts with a cooperating reading head secured to a spindlehead vertically movable along the column and above the base. Consequently, the vertical transducer directly provides a vertical positional feedback error control signal for controlling positional movement of the spindlehead and a tool spindle carried thereby vertically along the column and relative to a workpiece carried by the base. Thus, the tool spindle in prior machines is journaled in the spindlehead in a fixed, laterally spaced relationship to the vertical reading head carried thereby and in a variable, vertically spaced relationship above the horizontal reading head secured to the lower portion of the column adjacent the support base. Since both the horizontal and vertical position measuring transducers are thus remote from the position of the spindle being controlled, any errors in the cooperating spindlehead, column, and base slides contribute to errors in the selected position of the spindle. With the tool spindle positioned 30 inches vertically above the base, for example, horizontal positional measurements of the spindle would be determined by the horizontal transducer at a distance of 30 inches from the spindle. In such a case, it will be readily apparent that positioning movement of the spindle along a horizontal axis is completely dependent upon the accuracy of a positioning transducer that is remote from the spindle by a distance of 30 inches. Thus, any departure from true straight line motion in the cooperating slides between the base and the column due to ways that are not straight, nonparallel or skewed will directly result in errors in the selected horizontal positioning movement of the tool spindle. In prior machines, similar deviations in straight line motion between the spindlehead and vertical column likewise result in errors in positioning movement of the spindle in a vertical direction.

SUMMARY OF THE INVENTION

According to this invention, a pair of respectively extensible laser interferometers are arranged to comprise triangulation means for measuring and controlling positional movement of a machine member along orthogonal axes and relative to spaced apart portions of the machine frame. The triangulation measuring means are incorporated in a machine tool comprising essentially a support base, a column horizontally movable along the base, a spindlehead vertically movable along the column, and a horizontal tool spindle journaled in the spindlehead. A pair of servo-controlled power translators are respectively connected to effect servo-controlled power driven movement of the column horizontally along the base, and vertical movement of the spindlehead along the column and relative to the base. The support base may be used to carry a workpiece which is to be operated on by a tool carried in the selectively positionable, rotatable tool spindle. A tubular quill extends forwardly from the spindlehead both to support the forwardly projecting tool spindle, and to constitute a tubular bearing for pivotally supporting one end of each one of a pair of extensible vector members that cooperates to comprise the triangulation measuring means. Each of the vector measuring members comprises an extensible laser interferometer supported within a separate pair of cooperating telescoping members, one of which is pivotally secured to the spindle quill and the other of which is pivotally secured to a spaced apart portion of the base or frame. Thus, each of the laser interferometers is pivotally secured at one end to the spindle quill and extends in the angularly diverging direction for pivotal attachment toward its opposite end to a spaced apart portion of the base. In effect, each of the laser interferometers comprises separate members forming opposite sides of a triangle, the third side of the triangle being an imaginary line between the two spaced apart pivot support portions presented by the base. Irrespective of the vertical and horizontal position of the spindle within its allowable range of movements, the diagonally disposed laser interferometers provide a direct measurement between the axis of the tool spindle and the spaced apart pivot portions of the base.

By applying the Pythegorean theorem twice, the respective vector measurements are squared and combined with predetermined offset distances between the pivot portions of the base to provide coordinate orthogonal measurements indicating the spindle position along respective horizontal and vertical axes of movement. Actually, both vector measurements are transmitted to a control system that is disposed to provide a horizontal measurement of spindle position, and a vertical measurement of spindle position. The control system is adapted to receive horizontal and vertical digital command signals for controlling the vertical and horizontal servocontrol translators in accordance with horizontal and vertical feedback error signals initiated by the diagonal vector measurements.

Two different types of vector measurement control circuits are provided for supplying vertical and horizontal positional control feedback error signals.

In one of these two types of controls, digital signals from the vector transducers are transmitted to a counter and squared, the respective squared output from each being transmitted to a summing junction, and with each summing junction being interconnected to receive a predeterminately modified signal from the other cooperating transducer control. Each of the summing junctions is connected to transmit a modified squared signal to separate controls for extracting the square root of the prior summed signals. The respective signals from the binary coded square root control circuits are operative to provide positional error feedback signals for the respective X and Y axes of movement. In addition, as hereinbefore explained, controlling outputs from the square root control circuits are transmitted via branch conductors to the respective input summing junctions adapted to directly receive control information from the command signals.

In the other alternative type of control circuit, separate squaring controls are directly connected to be activated by positional input signals from the separate vector measurement transducers. The separate squaring controls are so arranged as to directly provide incremental control changes which respectively represent the difference between successive square root signals. The arrangement is such as to greatly expedite the computational speed of the respective transverse control signals by obviating the necessity for separate controls to perform squaring operations and additional cooperating square root controls for each of the vector measurement inputs. As before, however, the separate squaring controls are continuously and repetitively modified by concomitant input signals from the associated vector measurement transducer in a manner that each squaring control provides the appropriate lineal measurement command signal for the separate orthogonal axes of spindle movement. By means of the described arrangement, it is possible to achieve more than 300,000 computations per second to attain a traverse rate of 3 inches per second simultaneously following input commands for effecting orthogonal movements.

It is a general object of this invention to provide a more accurate and improved machine tool digital control system incorporating vector measurement transducers operatively connected to provide positional feedback signals for controlling movement along orthogonal axes.

It is a further object to provide position measuring laser interferometers in a control system for a machine tool to provide positional feedback error control signals to increase machine accuracy.

Another object of the invention is to provide an improved machine tool control system provided with a pair of diagonally disposed vector measurement means both pivotally connected at one end to a tool spindle and at their opposite diverging ends being pivotally connected to spaced apart portions of a support frame to provide direct vector measurements of spindle position.

A further object of the invention is to provide a tape control system incorporating vector measuring transducers coordinately connected to provide positional error feedback control signals operative to control movement along orthogonal axes.

A further object of the invention is to provide an improved positional control system for controlling orthogonal movements of a tool spindle having a pair of vector measuring interferometers respectively being pivotally interconnected between the spindle and spaced apart portions of a frame adapted to support the spindle for power driven movement along orthogonal axes.

A still further object of the invention is to provide a positional control system for a machine tool adapted to operate and greatly increase the speeds of computation to improve the positioning accuracy of the movable machine tool element being controlled.

The foregoing and other objects of this invention which will become more fully apparent from the following detailed description, may be achieved by the exemplifying apparatus depicted and set forth in the specification in connection with the accompanying drawings in which:

DESCRIPTION OF THE DRAWINGS

FIG. 7 is a schematic block diagram of a digital control circuit illustrating the interconnection of the separate vector measuring transducers to provide continuous measuring and error feedback control signals for controlling orthogonal movement of the spindle along a horizontal and vertical axis; and, FIG. 8 is a schematic block diagram of a vector measuring control circuit representing a modification of the circuit illustrated in FIG. 7 and showing a simplified method of directly responding to incremental differences between the square and the square root of separate vector signals.

DESCRIPTION OF THE PREFERRED EMBODIMENTS

Figure 1:
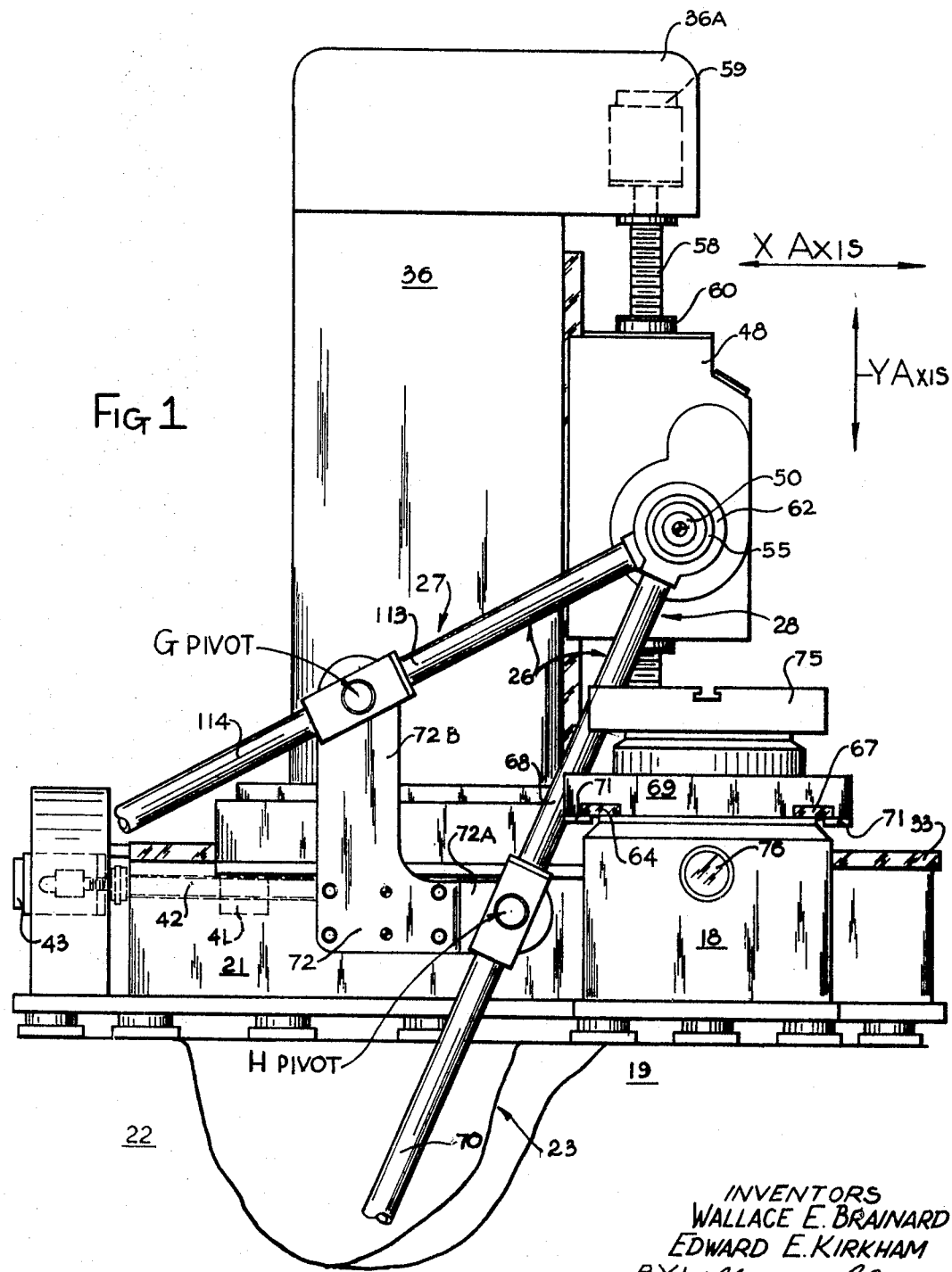
FIG. 1 is a view in front elevation of a machine tool incorporating vector measuring transducers directly connected to control power driven movement of an orthogonally movable tool spindle.
Figure 2:
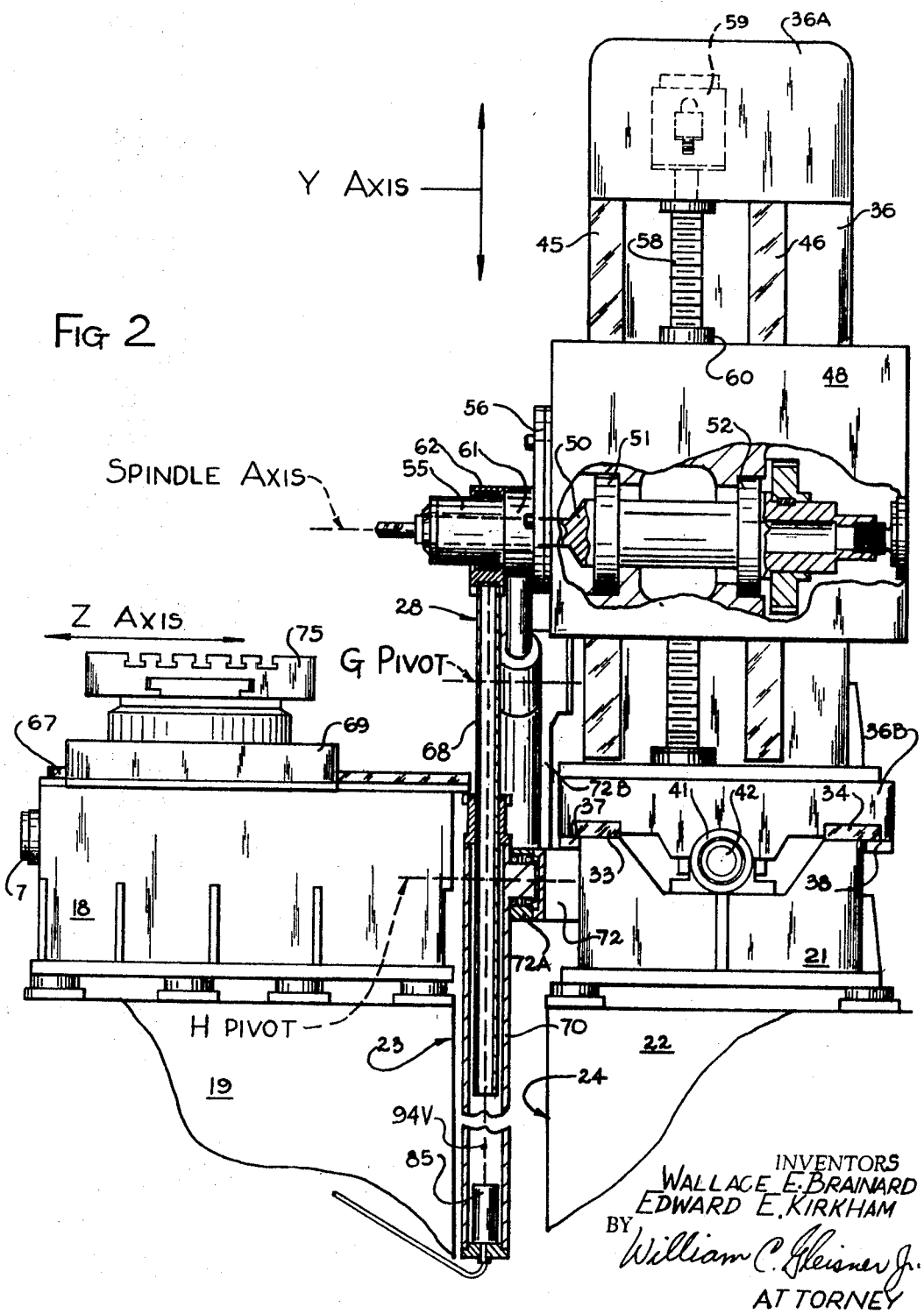
FIG. 2 is a view in left side elevation of the machine illustrated in FIG. 1 and showing the vector measuring means partly in elevation and partly in longitudinal section.

Referring now to the drawings, and more specifically to FIGS. 1 and 2 thereof, the machine tool there shown incorporates vector measuring transducer means for providing positional and feedback error control means for controlling positional movement of a tool spindle along orthogonal axes. As shown in the drawings, the machine is provided with a forward work supporting base 18 secured to a forwardly spaced foundation 19; and, a rearwardly spaced tool supporting base 21 secured to a like, rearwardly spaced foundation 22. The rearward base 21 is spaced apart from the base 18 a distance sufficient to provide an enlarged vertical opening 23 for receiving the vector measuring apparatus 26. In a similar manner, the rearward foundation 22 is spaced from the forward foundation 19 by a vertical opening 24 aligned with the enlarged vertical opening 23 between the bases 18 and 21 in a manner to receive the lower end of the measuring apparatus 26. The vector measuring apparatus 26 comprises a pair of separate rectilinear measuring transducers 27 and 28 both pivotally secured at one end to the spindle axis and at their opposite ends to spaced apart G and H pivot axes respectively carried by spaced apart portions of the tool support base 21.

The vector measuring members 27 and 28 comprise position measuring transducers adapted to continuously and directly measure the respective diagonal distances between the rotational axis of the tool spindle 50 and the spaced apart G and H pivot axes carried by the tool support base or frame 21. Diagonal measurements from the separate transducers 27 and 28 are operatively connected to provide feedback positional error control signals to a control system in a manner to indicate and control the position of the spindle 50 along the X and Y axes of movement.

As shown in FIGS. 1 and 2, it will be apparent that the tool support base 21 is adapted to support a tool for movement along the respective X and Y axes relative both to the base 21 and relative to a workpiece carried by the work support base 18.

To accomplish this, the tool support base 21 is provided with a pair of spaced apart horizontally extending ways 33 and 34. The lower portion of an upright column 36 is provided with complementary ways engaging the base ways 33, 34 and is slidably secured thereto by means of gibs 37, 38 respectively secured to the opposite lower edges of the column 36 in the usual manner. For effecting horizontal movement of the upright column 36 along the X axis, a depending nut 41 secured to the underside of the column is engaged by a rotatable translating screw 42 driven by a motor 43 carried by the tool support base 21.

The upright column 36 is provided with spaced apart vertical ways 45 and 46 adapted to support a spindlehead 48 for vertical movement along a Y axis. To support a tool for selective movement along the X and Y axes, the tool receiving spindle 50 is journaled for rotation about a horizontal axis in bearings 51 and 52 carried by the spindlehead 48. A forwardly extending, reduced diameter end of the rotatable tool spindle 50 is journaled within a tubular support quill 55 that is integrally formed with a vertical face plate 56 bolted directly to the front vertical face of the spindlehead 48. The outer circular surface of the tubular spindle support quill 55 is exactly concentric to the spindle axis and constitutes an accurate pivot support for one end of the respective vector measuring transducers 27 and 28.

For controlling vertical movement of the tool spindle 50 along the Y axis, a vertical elevating screw 58 is journaled to rotate at its opposite ends in laterally extending upper and lower column portions 36A and 36B integrally formed with the upright column 36. The rotatable elevating screw 58 extends through a suitable opening formed in the spindlehead 48 and engages an elevating screwnut 60 fixedly secured therein. Power for rotating the elevating screw 58 to move the spindlehead 48 in a selected vertical direction is derived from a drive motor 59 carried within the upper portion 36A of the column upright, as shown in FIG. 2.

Figure 3:
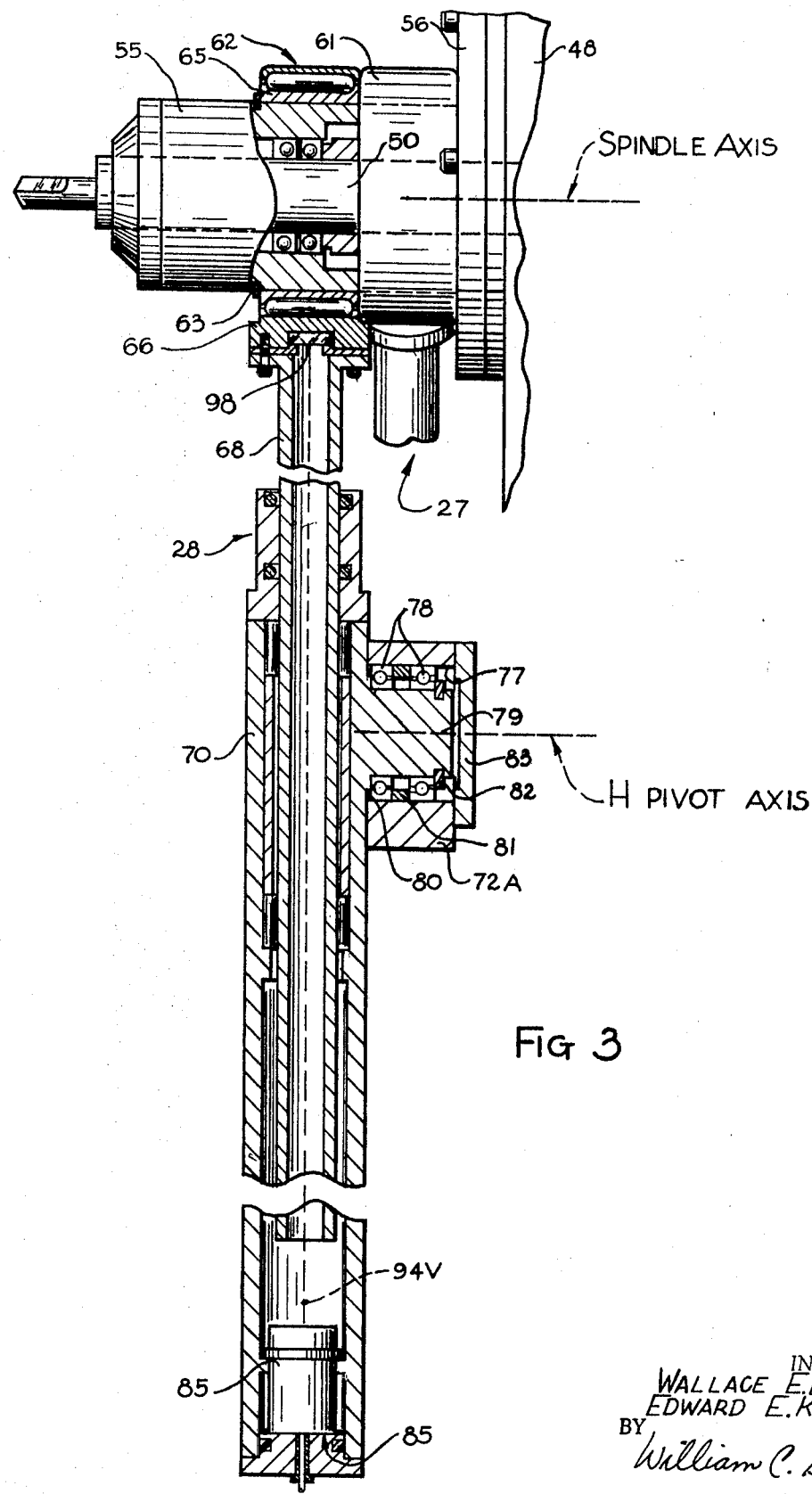
FIG. 3 is an enlarged fragmentary view, partly in side elevation of a tool spindle and a spindlehead support therefor, together with a laser transducer shown in longitudinal section and comprising one of the vector measuring control means.

As shown in FIGS. 2 and 3, the respective vector measuring transducers 27 and 28 are secured at one end to a pair of adjacent independent bearings 61 and 62 encircling the support quill 55 for individual pivotable movement. To maintain the bearings 61 and 62 in adjacent relationship, the support quill 55 is provided with a peripheral groove engaged by a snapring 63 abutting a side face of the inner race 65 of the forward bearing 62. The forward bearing 62 is provided with an outer race having an integrally formed radial extension 66 to which the upper flanged end of an inner tubular member 68 is secured by means of capscrews 69. The inner tubular member 68 comprises the upper portion of the vector measuring member 28, and is disposed in slidably extensible engagement with an outer tubular member 70, the latter being movably secured to the base 21 for pivotal movement about the H pivot axis.

To support the angularly diverging vector members 27 and 28 for pivotal movement about the G and H pivot axes, a vector support frame 72 is fixedly bolted to a vertical end face of the tool support base 21, as shown in FIG. 1. The vector support frame 72 is provided with a horizontally extending arm 72A integrally formed therewith and slightly spaced from the end face of the base 21 to provide an H pivot support. In a similar manner, the vector frame 72 is provided with a vertically upstanding arm 72B integrally formed therewith and spaced slightly away from the end face of the base 21 to provide the G pivot axis for the outer end of the vector member 27.

In the enlarged detailed view, FIG. 3, the horizontal vector support arm 72A is shown as being provided with an enlarged circular opening 77 concentric with the H pivot axis. The outer races of a pair of antifriction bearings 78, separated by a spacer 81, are disposed within the circular opening 77 of the horizontal support arm 72A and in position to engage an inwardly extending shoulder 80. A laterally extending circular hub 79 is integrally formed with the outer tubular member 70. The vector member hub 79 is supported by the frame support arm 72A for pivotal movement by the antifriction bearings 78 and retained in engagement therewith by a snapring 82 engaging an annular groove formed in the hub. A cover plate 83 is secured to a side face of the horizontal support arm 72A in a position to function as an enclosure for the circular opening 77 and the bearings contained therein.

For simplicity in the description, the member 28 is designated as a vector measuring member or transducer. Actually, the vector measuring member 28 may comprise any of the commercially available, rectilinear measuring transducers operably interconnected to measure the rectilinear distance between the spindle axis and the H pivot axis, as shown in FIG. 3. In a preferred form of the invention, the vector measuring member 28 comprises a fringe counting laser interferometer operatively carried within the cooperatively disposed, relatively extensible tubular members 68 and 70.

Figure 4:
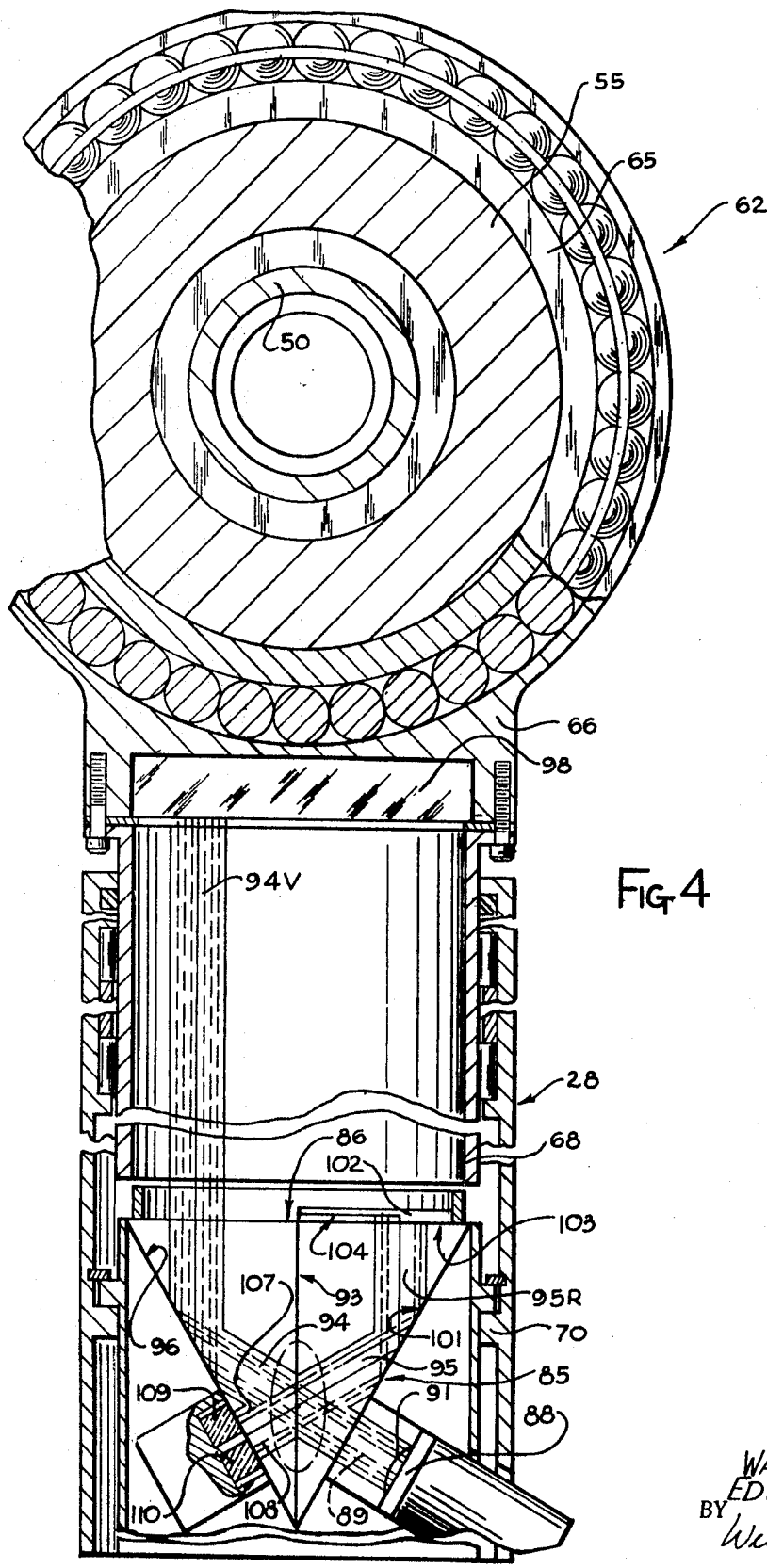
FIG. 4 is a view in longitudinal, transverse section through one of the vector measuring transducers, the fixed quill pivot support therefor, and the tool spindle journaled within the quill; the entire view being taken along the line 4—4 in FIG. 3.

As shown in FIGS. 3 and 4, and as hereinbefore explained, the interconnected telescoping tubular members 68 and 70 enclose a laser interferometer operative to precisely measure the distance between the spindle axis and the H pivot axis during bodily movement of the tool spindle 50. The interferometer carried within the extensible tubular members comprises essentially a first prismatic element 85 fixedly secured within the outer tubular member 70 and provided with a light transmissive base 86 perpendicular to the axis of movement thereof. A laser 88 shown in fragmentary form in FIG. 4 is carried by the outer tubular member 70 in a position to project an intense beam of light 89 toward an angular side face of the prismatic element 85. Although not shown in detail, the laser 88 is preferably a helium neon gas laser having an activating plasma tube positioned between spaced end brackets secured to a tubular housing, and is connected in the usual manner to be electrically energized by a source (not shown). The laser 88 is spaced from the side face of the prismatic element 85 by a tubular spacer 87. At its inner end the laser 88 is provided with a combined spherical reflector and collimating lens 91 adapted to project outwardly an intense coherent beam of collimated monochromatic light toward the angular, light transmissive face of the prismatic element. The prismatic element 85 comprises a modified form of double image Koesters prism provided with a semitransparent, beam splitting interface 93 disposed in perpendicular relationship to the base 86. Thus, the input beam 89 is divided by the beam splitter 93 into a transmitted beam 94 and a reflectively returned, fixed length reference beam 95. The transmitted beam 94 is reflected by an internal angular face 96 of the prismatic element 85, and reflected outwardly to constitute a variable length measuring beam 94V. A retroreflector 98 fixedly secured within the inner tubular element 68 is adapted to receive the outwardly projected beam 94V and reflectively return a coincidental beam along the same path as the transmitted beam for recombining at the beam splitting interface 93. The retroreflector 98 presents a beam reflecting face perpendicular to the axis of the tubular member 68 and radially spaced a predetermined distance relative to the axis of the spindle 50. The arrangement is such that both the transmitted beam 94V and the coincidental beam reflectively returned by the retroreflector 98 are parallel to the longitudinally extending axis of both tubular members 68 and 70 irrespective of the extensible movement therebetween.

To provide directional sensitivity in fringe counting measurements, an internally stepped reflector 102 is secured to the base of the prismatic element 85 in a position to receive the internally directed, fixed length reference beam. As shown in FIG. 4, the reference beam 95 reflected by the interface 93 is again reflected by an internal angular reflective surface 101 and directed along a path illustrated by the beam 95R toward the internally stepped reflector 102. The reflector 102 is provided with adjacent, stepped reflective surfaces 103 and 104 respectively disposed to shift adjacent beam portions by one-fourth of a wavelength to return phase differentiated beam portions along a path coincidental with the beam 95R. The reflectively returned beam portions are again reflected by the internal angular reflective surface of the element 85 and directed toward the interface 93 where they are recombined with the coincidentally returned, variable length measuring beam 94 to provide phase differentiated interference fringes.

Upon recombining of the coincidentally returned measuring beam and reference beam portions at the interface 93, there are provided phase differentiated portions of interference fringes 107 and 108 respectively transmitted to activate photodetectors 109 and 110 adhesively secured to an external side face of the prismatic element 85. The interference fringe portions 107 and 108 are provided with a difference in wavelength to provide a sensitivity to direction of movement as well as accurately measuring the distance traversed.

As described in connection with FIGS. 3 and 4, the vector measuring member 28 comprises a laser interferometer carried within the extensible tubular members 68 and 70 for measuring the exact distance between the spindle axis and H pivot axis. In a similar manner, the vector measuring member 27, shown in FIG. 1, comprises a pair of telescopic, tubular members 113 and 114. In like manner also, a laser measuring interferometer (not shown) is operatively disposed in the extensible, tubular members 113 and 114 for accurately measuring the existing diagonal distance between the spindle axis and the G pivot axis. In view of the similarity between the laser interferometers carried within the respective vector measuring members 28 and 27, however, it is not deemed necessary to show or describe in detail the interferometer within the member 27. The mode of operation and disposition of parts of the respective interferometers are identical, and both function to provide positional indicating signals for indicating the respective distances between the spindle axis and the cooperating G and H pivot axes during bodily movement of the tool spindle along the X and Y axes of movement.

As will hereinafter be more fully explained, there is provided a positional control system operative to control bodily movement of the tool spindle along the X and Y axes in response to predeterminately combined positional error feedback control signals from the vector measuring members 27 and 28. Thus, the tool spindle 50, as well as the spindle supporting head 48, is positionable along the X and Y coordinates in accordance with direct vector measurements between the spindle axis and the G and H pivot axes respectively.

As shown in FIGS. 1 and 2, the forwardly spaced work support base 18 is provided with spaced apart horizontal ways 64 and 67 adapted to slidably support a saddle 69 for horizontal movement. A pair of gibs 71 secured to the opposite outer edges of the saddle 69 engage the underside of the respective ways 64 and 67 to guide the saddle for Z axis movement relative to the column 36. A worktable 75 carried by the saddle 69 is adapted to support a workpiece (not shown) in operative relationship to a tool carried by the tool spindle 50. Thus, the worktable is movable along a horizontal Z axis in coordinated relationship with movement of the tool spindle 50 along the X and Y axes. For selectively moving the worktable 75, a motor 76 secured to the base 18 drives a screw and nut translator (not shown) connected in well-known manner to move the saddle 69 along the support ways 64 and 67.

Figure 5A:
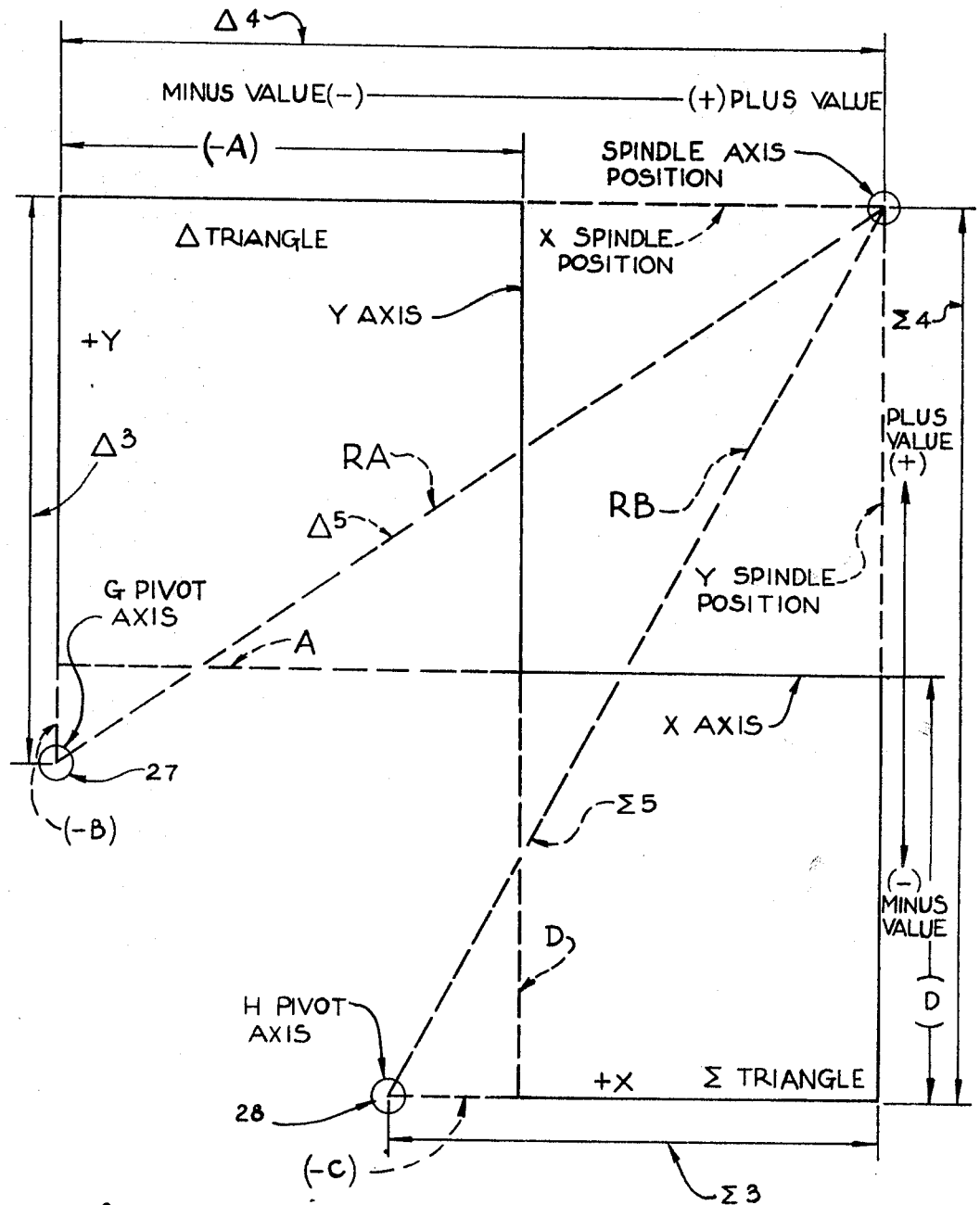
FIG. 5A is a diagrammatic view illustrating the method of utilizing the vector measurements to achieve orthogonal control.
Figure 5:
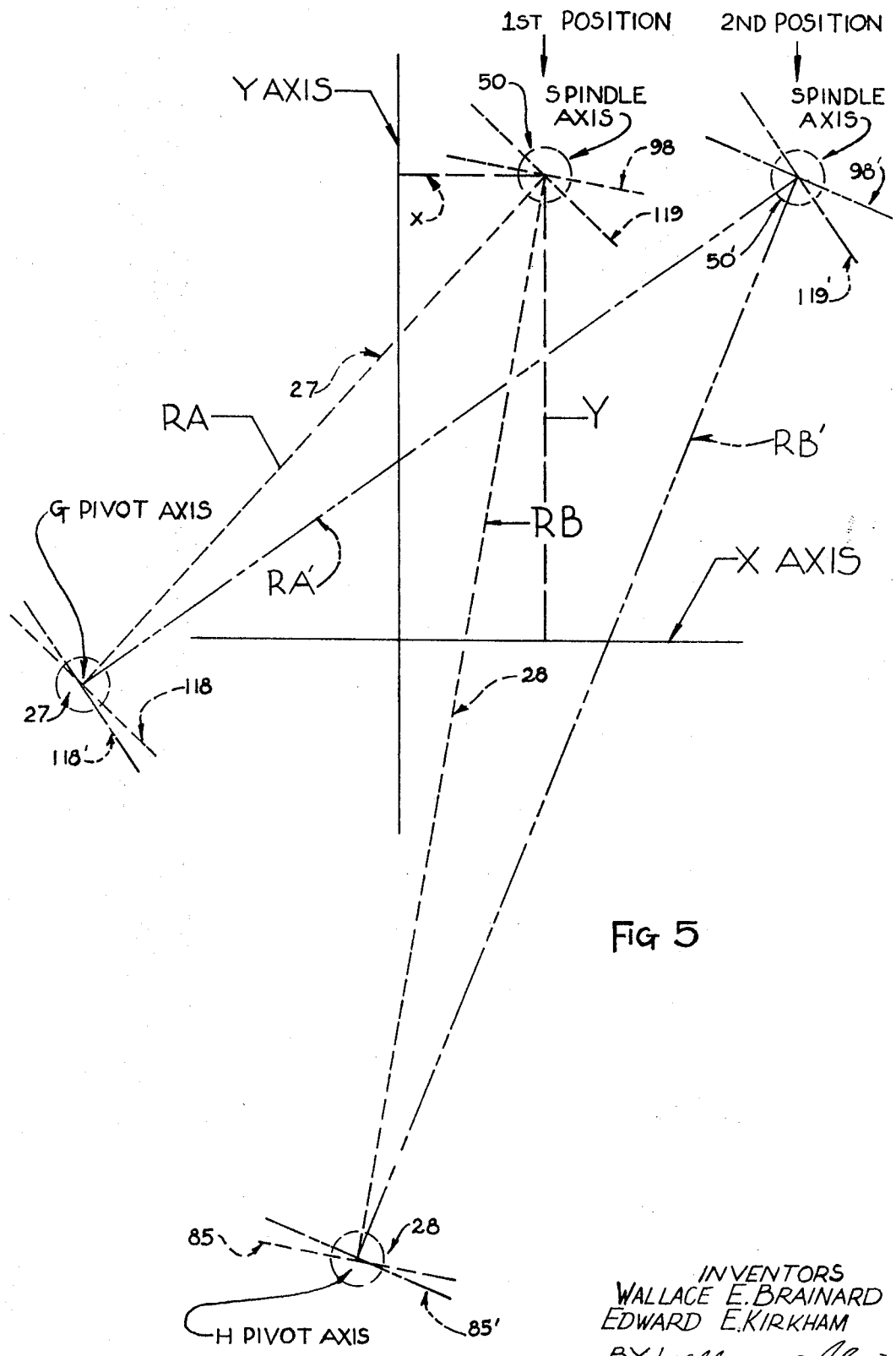
FIG. 5 is a schematic line diagram illustrating movement of the tool spindle transversely along the horizontal axis, and showing dimensional changes in both vector measuring means for the two different spindle positions illustrated, as well as a fixed offset for the separate transducer reflectors.

In FIG. 5 there is diagrammatically illustrated the relationship between the vector measuring members 27 and 28 and the axis of the tool spindle 50, with the spindle being represented in two different positions. The position of the tool spindle 50 is represented with respect to the coordinate vertical Y axis and horizontal X axis respectively. The first position of the tool spindle 50 is illustrated by the dashed lines interconnected between the tool spindle and the respective measuring beam originating interferometers 27 and 28. The second position of the tool spindle is represented by the broken lines interconnected between the spindle (identified as 50') and the respective G and H pivot axes associated with the interferometers 27 and 28. In both the first and second positions of the tool spindle illustrated in FIG. 5, the vertical Y distance from the horizontal X axis is identical. Thus, in moving rightwardly from the first to the second position, only the X distance is changed. During such rightward horizontal movement, however, both of the diagonal pairs of vector measurements are changed as indicated by the dashed lines and broken lines respectively.

With the spindle 50 in its first position illustrated in FIG. 5, the prismatic element 85 of the interferometer 28 is so pivoted relative to the H pivot axis as to project a laser measuring beam RB toward the cooperating optically aligned retroreflector 98. As hereinbefore explained, the tubular, extensible interconnection between the prismatic element 85 and retroreflector 98 effects appropriate pivotal movement of both to maintain proper alignment therebetween for receiving and returning a coincidental beam RB toward the prismatic element 85. Simultaneously therewith, a prismatic element 118 associated with the interferometer 27 is so pivoted relative to the G pivot axis as to project a laser measuring beam RA toward a cooperatively disposed retroreflector 119 comprising the cooperating portion or prismatic element of the interferometer 27. As indicated in FIG. 5, it will be apparent that the retroreflector 119 is pivotally positioned relative to the pivot axis of the spindle 50 for reflectively returning a coincidental beam RA toward the prismatic element 118 because of the extensible tubular interconnection. With these conditions existing, the fringe counting interferometers 27 and 28 are respectively operative to accurately indicate the diagonally measured, lineal distances RA and RB respectively illustrated as interconnected between the spindle axis and the G and H pivot axes on the machine base.

With the tool spindle moved rightwardly to the second position illustrated in FIG. 5, the positions of the respective interferometers 27 and 28 are changed as indicated by the broken lines, and as indicated by the suffix "prime" after several of the reference numerals. With the spindle 50 displaced rightwardly, the respective prismatic element 85' and cooperating retroreflector 98' comprising the interferometer 28 are pivoted to project and coincidentally return the fringe counting measuring beam $RB^1$. In a similar manner, with the spindle in its rightwardly moved position, the prismatic element 118' and cooperating retroreflector 119' comprising the interferometer 27 are pivoted to appropriate positions for projecting and coincidentally returning the fringe counting measuring beam identified as RA'. With the spindle in its second position in FIG. 5, it is emphasized that the cooperating and telescopingly interconnected portions of the interferometers 27 and 28 are identical, but have been merely pivoted to positions appropriate to the changed horizontal position of the tool spindle.

During operation of the machine incorporating the vector measuring position control apparatus of the present invention, both of the vector measuring members 27 and 28 are continuously operative to provide separate vector measuring beams, such as RA and RB described in connection with FIG. 5. As will hereinafter be more fully explained, the vector measuring beams RA and RB cooperate to provide orthogonally disposed separate X and Y signals that continuously indicate spindle position along the X and Y axes. Whenever the numerical input command signal requires horizontal spindle movement, such as movement from the first to the second position in FIG. 5, different horizontal X command signals are provided to effect the required movement, with the vertical Y command signals remaining the same. A numerical control system is arranged to supply orthogonal input command signals that are compatible with the respective X and Y position indicating signals resulting from separately combining the fringe counting measurements from the respective beams RA and RB. With the vector measuring signals RA and RB being continuously utilized to provide compatible orthogonal X and Y signals, there are provided error command signals representing the difference between the spindle actual and numerically commanded position. Depending upon the orthogonal input command signals, therefore, the resulting error command signals are operative to effect servo-controlled translating movement of the spindle 50 along the X and Y axes as may be required.

To better illustrate the method of utilizing vector measurements to provide the necessary orthogonal feedback signals, FIG. 5A diagrammatically illustrates the G and H pivot positions with respect to the axis position of the spindle 50. Although no structure per se is represented in FIG. 5A, the vector measuring beams RA and RB associated with interferometers 27 and 28 are shown as continuously measuring separate orthogonal signals giving X and Y axis positions. The vertical or Y axis is represented as extending from north to south, and intersects the horizontal or X axis which extends from east to west. The solid line portion of the Y axis and the solid line portion of the X axis delineate a quadrant within which the tool spindle 50 is movable relative to the spaced apart G and H pivot axes. Thus, the solid line radii X and Y delineate a first or NE quadrant within which the tool spindle 50 is selectively movable along any combination of axes. In a similar manner, the spaced apart pivot axes G and H of the respective interferometers 27 and 28 are within the third or SE quadrant in the manner that interferometric vector measurements are available even when the spindle 50 is moved into proximity to the intersection of the X and Y axes. The particular locations shown for the spindle axis, as well as the G and H pivot axes are for illustrative purposes. It will be understood that other locations may be used for these axes without interfering with operation.

To facilitate explaining the derivation of the separate orthogonal position indicating error signals, separate delta and sigma triangles are illustrated in FIG. 5A. The delta triangle comprises adjacent perpendicular legs designated as having values of delta 3 and delta 4 with the hypotenuse being designated as delta 5. For this disclosure, the vector measuring beam RA, extending between the axis of the spindle 50 and the G pivot axis is considered equivalent to the delta 5 hypotenuse of the delta triangle in FIG. 5A, in spite of the offsets between the optical elements and the respective pivot axes. That leg of the delta triangle designated as having a delta 4 value actually comprises two values including a positive or variable X spindle position plus a (−A) or fixed value extending between the Y axis and a line indicated as parallel thereto and extending through the G pivot axis. Incidentally, those values rightward or west of the vertical Y axis have a positive or plus value, as indicated in FIG. 5A, and those values leftward or east of the Y axis are negative In a similar manner, all values above or north of the horizontal X axis are positive in value and those values below or south of the horizontal X axis line are negative in value.

Referring again to the delta triangle in FIG. 5A, the delta 5 hypotenuse thereof continuously representing the RA vector measurement being known, it is necessary to obtain the horizontal value for the X spindle position designated by the dashed line extending between the spindle 50 and the vertical Y axis. The X spindle position is necessary to develop an error command signal according to the horizontal input command signal from the control system, and compatible with the servo translator for effecting X axis movement. In addition to the vector value RA, several other values for the two legs of the delta triangle are likewise known. As hereinbefore explained, the delta 4 leg of the triangle equals X (−A) representing the leftward or east offset of the G pivot axis. That leg of the triangle designated as having a delta 3 value extends perpendicularly upward from the G pivot axis. The delta 3 leg of this triangle comprises the fixed value (−B), representing the negative offset of the G pivot axis, plus the value Y, or the present existing position of the spindle 50 along the vertical Y axis. Therefore, the delta 3 leg of the triangle can be designated as (Y−B). Thus, in both the delta 3 and 4 legs of the triangle, the only fixed values are (−B) and (−A) respectively.

In a similar manner, the sigma triangle is represented as provided with a hypotenuse indicated as sigma 5 which is the RB vector measurement delineating the distance between the spindle axis and the H pivot axis for the interferometer 28. The vertical leg of the sigma triangle is denoted as having a value of sigma 4 comprising the Y spindle position plus the fixed offset (−D) value representing the distance of the H pivot axis downwardly from the horizontal X axis. The lower horizontal leg of the sigma triangle is indicated as having a value of sigma 3 representing the distance between the H pivot axis and a line extending perpendicularly downward from the axis of the tool spindle 50. The sigma 3 leg of the triangle comprises the existing (X) distance plus the offset (−C) indicating the fixed distance of the H pivot axis leftwardly from the vertical Y axis. Thus, the sigma 3 leg of the sigma triangle equals (X−C).

Depending upon the input command signals from the control system for effecting selected movement of the spindle 50, the values for the horizontal X spindle position and vertical Y spindle position may be selectively changed. In view of this, the only fixed values for the sigma triangle are the (−D) offset in the vertical leg, and the (−C) offset value in the horizontal leg. With the RB vector measurement together with the offset values (−C) and (−D) of the sigma triangle known, it is necessary to obtain the X positional signal for the spindle 50 along the horizontal axis. In view of the fact that the vertical and horizontal position of the tool spindle 50 is changed in accordance with numerical input command signals from the control system, it will be apparent that each leg of the respective delta and sigma triangles will be changed according to the change in position of the tool spindle. Thus, the identifying values 3, 4 and 5 respectively associated with the delta and sigma triangles have been used only for illustrative purposes in designating the corresponding sides of the respective triangles.

To facilitate following the various designations for positioning the tool spindle 50, FIG. 5A includes the Pythagorean theorems for obtaining the vertical Y and horizontal X positions of the tool spindle. As there indicated, $RA^2$ of the delta triangle equals $(X-A)^2+(Y-B)^2$. Consequently, $Y$ equals $B$ plus the square root of $[RA^2-(X-A^2)]$. In a similar manner, $RB^2$ of the sigma triangle equals $(X-C)^2+(Y-D)^2$. As a result, the horizontal position of the spindle 50 is represented by the formula $X$ equals $C$ plus the square root of $[RB^2-(Y-D)^2]$.

Figure 6:
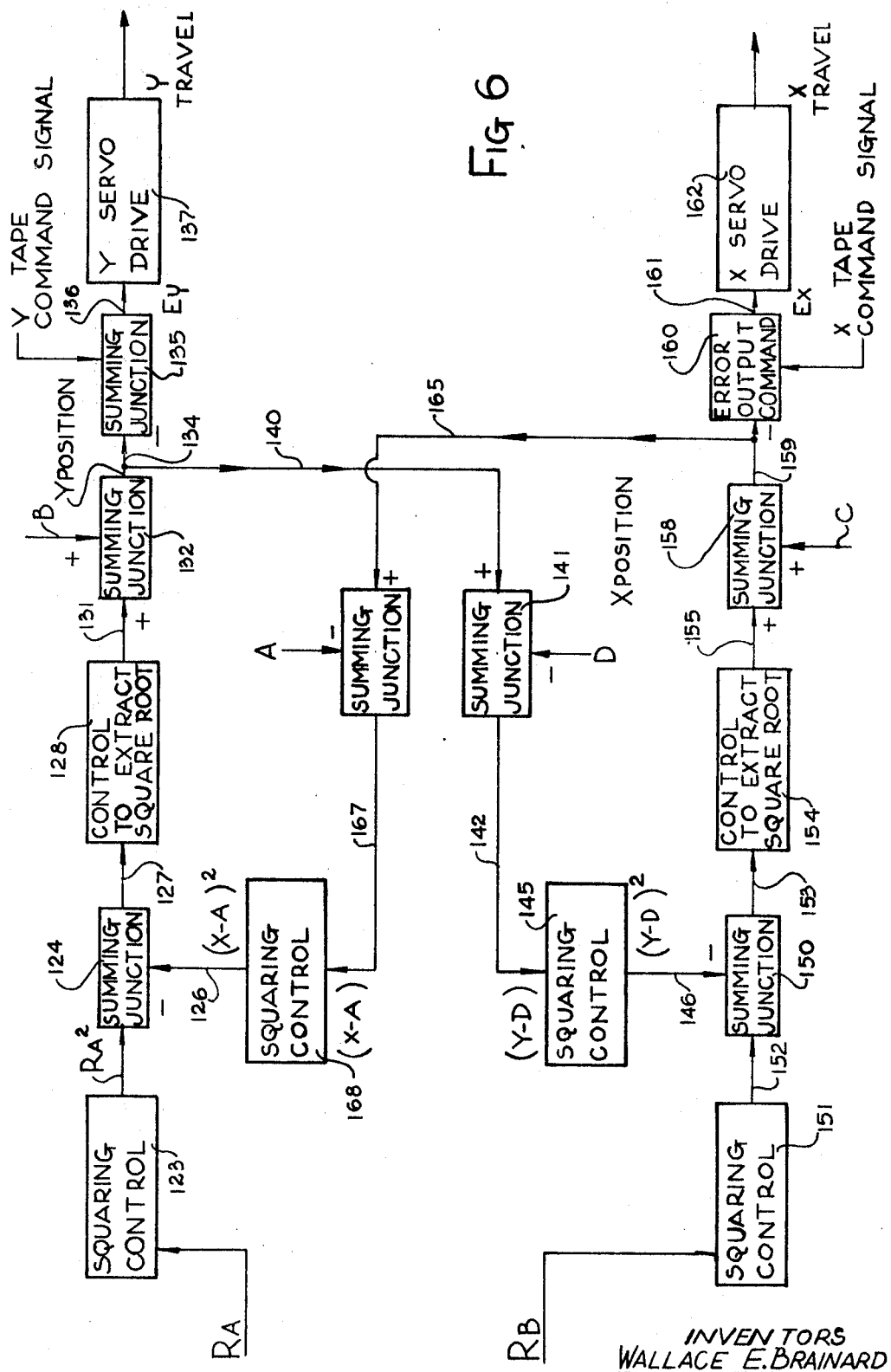
FIG. 6 is a schematic diagram of a control circuit for utilizing the vector measurements shown in FIG. 5A.

As shown in FIG. 6, there is represented in simplified diagrammatic form a control circuit for utilizing the separate vector measurements RA and RB as input command signals to provide coordinate servo-controlled movement along the respective transverse X and Y axes. The fringe counting measuring beam signal RA is transmitted to a squaring control 123 operative to continuously square the vector input signal. From the control 123, the continuously squared signal RA is transmitted to a summing junction 124 which is simultaneously connected via an input conductor 126 to continuously receive a modifying signal $(X-A)^2$ originating with the RB vector signal. Both of the input signals received by the summing junction 124 are added to provide one signal and transmitted therefrom by an output conductor 127 to a square root control 128 that is operative to continuously extract the square root of the combined signals supplied thereto. The square root control 128 is connected via a conductor 131 to transmit the continuously pulsating square root signal to a summing junction 132 that is simultaneously connected to receive a fixed pulse input signal B and corresponding in magnitude to the fixed offset for the G pivot axis, as illustrated in FIG. 5A. The summing junction 132 is operative to combine the variable square root signal received from input conductor 131 and the fixed pulse input signal B to provide a continuous output signal that functions to continuously indicate the vertical or Y position of the tool spindle. The existing Y position signal is transmitted via conductor 134 to the error output command 135 that is simultaneously connected to receive a numerical digital or tape input command signal indicated as the Y command and being operative to effect the required vertical spindle movement along the Y axis. Conductor 136 is connected to transmit an error command signal of proper polarity for effecting directionally controlled actuation of the Y axis servodrive 137; and comprising the difference between the Y tape command signal and the Y error command along the input conductor 134. The error command signal along the conductor 136 effects movement of the spindle the required distance along the vertical or Y axis.

Simultaneously with effecting Y axis movement, the conductor 134 is connected via a depending conductor 140 to provide a signal for predeterminately modifying the concomitant vector control signal RB. The positive Y position input signal from the conductor 140 is transmitted to a summing junction 141 that is connected to receive a minus D input signal of fixed value corresponding to the fixed vertical offset position of the H pivot axis as indicated in FIG. 5A. As previously explained, the variable value of (+Y) is combined with the fixed input value of (−D) by the summing junction 141 and the resulting value, in the case (Y−D) is transmitted by conductor 142 to a squaring control 145. In a manner similar to that before described, the squaring control 145 functions to continuously square the input value to provide an output value of $(Y-D)^2$ which is transmitted via conductor 146 to another summing junction 150 interconnected in the position indicating control for the X axis.

At the same time, the fringe counting measurement signal RB is transmitted to a squaring control 151 which is operative to provide a continuously squared, pulsating output signal via conductor 152 for transmitting the value $(RB)^2$ to the summing junction 150. The two variable inputs schematically illustrated as being supplied by conductors 146 and 152 are added by the summing junction 150 and transmitted therefrom along an output conductor schematically indicated at 153 connected to a control 154 operative to continuously extract the square root of the combined input signal. The continuously pulsating output signal from the square root control 154 is transmitted by a conductor 155 to another summing junction 158 connected to receive a fixed pulse input signal (C) corresponding to the fixed horizontal offset position of the H pivot axis in FIG. 5A. The summing junction 158 is disposed to add the pulsating input signals to provide a combined output signal via conductor 159 for indicating the horizontal or X position of the tool spindle. The existing X position signal is transmitted by conductor 159 to an error output command 160 that is connected to receive a digital numerical or tape input command signal for controlling X axis movements. From the error output command 160, an error signal is transmitted by conductor 161 for actuating an X axis servodrive 162 to effect the necessary and required horizontal movement along the X axis.

As this occurs, a value corresponding to the X axis position is transmitted from the conductor 159 along a conductor 165 connected to provide a positive input signal to a summing junction 166. Simultaneously, the summing junction 166 is connected to receive a continuously pulsed signal (−A) corresponding to the fixed horizontal offset of the G pivot axis, as shown in FIG. 5A. The resulting combined signal (X−A) is transmitted along conductor 167 to a squaring control 168 adapted to provide a continuous output having the value $(X-A)^2$ transmitted along conductor 126 to provide the modifying input signal to the summing junction 124.

The logic relationships between various portions of the control circuit for converting spindle position vector measurements, such as RA and RB, are illustrated in FIGS. 5A and 6. As hereinbefore explained, a numerical input command to effect movement along one single axis operates to provide position indicating feedback signals from both the RA and RB vector measuring beams to activate both of the squaring controls 123 and 151. For example, 2 inch numerical input command to the error command control 135 will operate to actuate the Y axis servodrive 137 for effecting a 2 inch vertical movement. In the absence of X input commands to the error command control 160, the X axis servodrive 162 will merely function to dynamically retain the spindle in its existing X axis position while the 2 inches of vertical Y axis movement is taking place. During such a 2 inch Y command, the RA vector measuring beam actuates the squaring control 123 to initiate a signal modified by the input via conductor 126, for effecting 2 inches of movement along the Y axis. As previously explained, the Y positional signal initiates a modifying control along conductor 146 to the summing junction 150 connected to receive the input from the vector measuring beam RB. Thus, during such a command for 2 inches of vertical Y axis movement, the input from conductor 146 to the summing junction 150 counteracts the simultaneous RB vector signal from the conductor 152 thereby obviating any output signal for effecting X axis movement. As the commanded Y axis movement is being effected, however, it will be apparent that the vector measuring beam RB is continuously changing in corresponding changed relationship to an opposite change in the modifying signal transmitted from the Y position indicating conductor 134 to the summing junction 150. Likewise, during such a described 2 inches of movement along the Y axis, modifying signals will be available from the input conductor 126 in spite of the fact that no X position signal for movement is available from the conductor 159.

The simplified diagrammatic circuit drawing of FIG. 6 is provided simply to implement the logic and mathematical relationships explained in connection with FIG. 5A for developing the orthogonal command signals. For purposes of explaining the operation of this invention, it is not deemed necessary to describe in detail the various gating controls and shift registers which would be required for effecting positionally controlled movement along either the X or Y axes. Again assuming an input command for effecting 2 inches of Y movement with no X movement being required, the Y axis servodrive 137 is operated to effect 2 inches of movement in a selected direction with the X axis servo 162 functioning merely to dynamically retain the spindle in its existing X axis position. After the selected Y axis movement is effected, both servos 137 and 162 would function merely to retain the spindle in its selected position with the Y and X error command controls 135 and 160 being available for receiving the next input command signals for effecting the next required movements. In effecting the described 2 inches of vertical Y axis movement, a predetermined number of pulses corresponding to light fringe signals from the respective measuring beam interferometers are supplied to equal a cumulative total of 2 inches along the Y axis. Each light fringe equals 6.25 micro inches or 6¼ millionths of an inch. Depending upon the selected direction of movement, the control system is operative to increment or decrement the total error command pulses for effecting movement to the commanded position in the selected direction.

In FIG. 7 there is represented an expanded block diagram illustrating the source and distribution of the fixed pulse trains corresponding to the offset positions for the respective G and H pivot axes of the interferometers 27 and 28 as described in FIG. 5A. In FIG. 7 there is likewise illustrated the method of interconnecting controllers comprising shift registers for squaring the respective RA and RB vector measurements, summing the squared values with variable pulse train inputs, and then extracting the square root of the summed inputs of the pulse trains. Selective control of bidirectional movement along the X and Y axes is likewise illustrated as available due to the phase differentiated input signals from the vector measuring interferometers 27 and 28 respectively.

As schematically shown in FIG. 7, input commands for effecting selected machine movements are derived from a numerical control system 166, preferably provided with a punched command tape movable relative to a tape reader (not shown) in well-known manner to provide a source of digital input command signals for effecting the various digitally controlled movements. As known in the art, the punched tape commands comprise blocks of predetermined input data for effecting the available machine functions in the required sequence. Such input command signals are adapted to provide commands as to spindle speed rate, feed rate, and extent of positional movement along the X, Y and Z axes respectively. As hereinbefore explained, this invention is directed principally to the derivation of orthogonal positional indicating signals to establish the basis for effecting error command of spindle movements in response to continuous vector measurements of spindle position. To accomplish this, a unified control system is provided for continuously translating vector measurements of spindle position into separate orthogonal pulse train signals indicating spindle position along the X and Y axes. The servomotors are then actuated to selectively move the spindle along the respective axes in accordance with error signals comprising the difference between the axial input tape command signals and the axial position signals derived from the positional vector measurements. The extent of movement to the selected X and Y positions is determined by the total number of digital pulses, and the speed of moving to the preselected positions is determined by the frequency of the predetermined positional command pulses comprising the X and Y commands.

As schematically shown in FIG. 7, the numerical control system 166 is connected via conduit 167 to selectively actuate a spindle rate control 169 for operating the tool spindle 50 at a predetermined rate, or for stopping spindle rotation. Likewise, the control system 166 is adapted to provide a digital control signal along a conduit 171 connected to provide Z axis commands 172 for moving the worktable 75 at a selected rate and direction of movement along the Z axis, or for stopping table movements. In a similar manner, the control system is connected to transmit positional and rate control commands along a conduit 174 connected to actuate a Y axis control command register 175 connected via a conduit 176 to provide positional control data to a Y axis digital servo error controller 178. In addition, the numerical control system 166 is connected via a conduit 182 to supply rate and position commands to actuate an X axis command register 183 connected via a conduit 184 to supply a positional command signal to an X axis digital servo error controller 186.

With the various shift registers 169, 172, 175 and 183 supplied with the necessary input command data, an end of block or sequence control signal from the numerical control system 166 is then operative to effect machine operation in accordance with the commands thus stored. As known in the numerical or tape control arts, a control tape is punched in binary or binary coded decimal format comprising sequential rows of holes representing in binary form various numerical instructions for the various functions available. After each succeeding group or groups of words comprising the command data for effecting machine functions, the tape is punched with an end of block or sequence control signal. Each such sequence control signal is connected to actuate the machine by means of a controller (not shown) to actuate the machine for performing the command functions stored immediately prior to that particular sequence signal. Inasmuch as the end of block or sequence signal for effecting machine functions in accordance with stored data is known, it is not deemed necessary to show in detail the various gating command signals for accomplishing the functions to be performed.

As will be explained, the X axis position register 189 and the Y axis position register 190 are adapted to provide signals for indicating the existing position of the tool spindle 50 along the respective X and Y axes in the form of a digital pulsed signal compatible with the command signals respectively transmitted to the X and Y shift registers 183 and 175. Existing X axis position signals are transmitted from the X register 189 via a conduit 192 to the X axis digital controller 186. The difference between the X axis command signal via conduit 184 and the existing X axis position signal via conduit 192 operate to actuate the X axis digital servocontrol 186 for providing an output error signal along conductor 193 to effect the required directionally controlled movement of the X axis servomotor 43.

In a similar manner, the difference between the Y command signal along conduit 176 and the existing Y axis position signal along conduit 195 actuates the Y axis digital servocontroller 178 to provide an error signal along the conductor 196 for effecting actuation of the Y axis servomotor 59 to move the spindle the required distance along the Y axis. Thus, depending upon the input command signals and the input position signals, the respective digital servocontrollers 178 and 186 are operative to effect the required directionally controlled movement of the servomotors 59 and 43 for moving the spindle to selected position.

The usual source of electrical energy (not shown) is connected to energize the laser for the interferometer 28, as well as the phase differentiated photodetectors 109 and 110 associated therewith. As hereinbefore explained, with reference to FIG. 4, the photodetectors 109 and 110 are energized to provide fringe signals in quadrature spaced relationship upon relative movement between the beam splitting Koesters prism 85 and the axis of the spindle 50. Thus, upon telescoping movement of the interferometer 28 in either direction relative to the spindle, fringe counting signals are transmitted from the respective photodetectors 109 and 110 via output conductors to energize Schmitt triggers 201 and 202 respectively. The signals are then transmitted via conductors 203 and 204 to a synchronizer 207 connected to maintain the proper phase difference therebetween and operative to transmit phase differentiated, direction indicating signals via conductors 209 and 210 to a counter 212. The counter 212 comprises a shift register operative to provide pulsating light fringe signals that continuously indicate the total vector distance between the pivot axes including the length of the vector measuring beam RB plus the fixed offsets at the opposite ends of the beam. Inasmuch as a laser interferometer is a preferred vector measuring device, each light fringe would have an incremental value of 6¼ millionths of an inch. This invention, however, is not restricted to laser interferometers for vector measurements, nor is it restricted to pulses having the values specified. Obviously, other types of measuring transducers can be utilized to provide vector measurements, and the pulses can be of other predetermined values.

Depending upon the direction of extensible movement of the interferometer 28, the counter 212 is adapted to provide an output signal having a negative value along conductor 214 or a positive value along conductor 215. The conductors 214 and 215 are connected to transmit vector measuring signals to a controller 218 schematically represented as operative to continuously square the total number of pulses comprising the position indicating vector beam RB. From the RB squaring control 218, the successive squared signals are transmitted via a conduit 220 to a summing register 221. The summing register 221 is connected via another input conductor 223 to receive a continuous, variable pulsed signal from an auxiliary control 224. As will hereinafter be more fully explained, the variable pulsed signal from the control 224 varies in accordance with changes in the vector measurement effected by the laser interferometer 27. The summing register 221 is operative to continuously add the total signals supplied by the separate input conductors 220 and 223, and is connected to transmit the continuously changing total signal via a conduit 227 to a controller 228 as schematically indicated in FIG. 7. The control circuit within the controller 228 is operative to extract the square root of the summed input supplied via input conductor 227, and transmit the reduced or square root of the summed input via a conductor 229 to another summing unit 231. At the same time, a pulse divider 235 is operative to provide a fixed pulse output signal having a (−C) value corresponding to the numerical value of the horizontal offset for the H pivot axis, as shown in FIG. 5A. The fixed pulse output (−C) is transmitted via a conductor 234 to the summing unit 231 which functions to add the fixed pulse input to the variable pulse input received via input conductor 229, and is connected via an output conduit 237 to provide the resulting position indicating signal to the X axis position register 189.

In addition to supplying a positional signal for continuously actuating the X axis position indicating register 189, the output conductor 237 is connected to supply a signal of like pulsating value via a branch output conduit 239 to a controller 240 adapted to proportionately modify the Y axis position indicating signal.

In addition to receiving a positional command signal equal to the X position via input conductor 239, the controller 240 is connected via an input conductor 242 to a pulse divider 243 operative to supply a fixed pulse output signal having a value of (−A) that is equal in value to the fixed horizontal offset (−A) of the G pivot axis shown in FIG. 5A. The pulse control divider 243 is connected via a conductor 245 to be energized by a pulse train generator or clock 246 that is likewise connected via an output conductor 248 to energize the pulse divider 235 for effecting the fixed value (−C) signal. The clock 246 likewise provides pulse trains via conductors 250 and 251 respectively connected to energize pulse controlling dividers 253 and 254 for providing (−B) and (−D) signals. Actually, the clock 246 maintains the proper synchronism between all portions of each of the circuits illustrated in both FIGS. 7 and 8.

The pulse train divider 253 is operative to provide a fixed pulse measuring signal equivalent in measurement length to the vertical offset (−B) for the G pivot axis, as shown in FIG. 5A. From the fixed pulse rate controller 253, a continuous pulsating signal (−B) is transmitted by a conductor 256 which is connected to supply a fixed pulse input signal to a summing unit 257 for determining the orthogonal Y axis position. At the same time, the controller 240 is connected to continuously square the value of the input signals (X−A) to provide a squared signal along an output conductor 258. Thus, a variable pulsed signal control 259 is activated by the conductor 258 and connected to provide an output signal along a conductor 260 for providing one variable input to a summing register 263 operative to control Y axis position.

In a similar manner, the pulse train divider 254 is operative to transmit a pulsating signal of a (−D) value via a conductor 264 to an intermediate controller 265 that is simultaneously connected to receive an input signal via a conductor 267. The fixed pulse signal (−D) is equal to the numerical value of the vertical (−D) offset for the H pivot axis as shown in FIG. 5A.

As schematically illustrated in FIG. 7, the value of the pulsating signal from conductor 267 varies in accordance with a variation in the orthogonal Y position of the tool spindle as determined by the Y axis summing unit 257. The controller 265 is operative to continuously square the sum of the input signals received via conductors 264 and 267, and operates to provide a pulsating output signal having a value of (Y−D) squared which is transmitted along an output conductor 268 connected to provide the variable pulsed signal 224. In addition to the variable pulsed signal 224 for modifying the X axis position signal, the pulse generating clock 246 is connected via the conductor 248 to energize the pulse train divider 235 which is connected via conductor 234 to transmit a fixed value pulsating output signal (−C) to the summing unit 231, as hereinbefore explained.

For effecting the pulsating measurement of the RA vector beam, the transducer 27 is provided with a pair of photodetectors 271 and 272 secured to the unitary prismatic element 118. In a manner similar to that hereinbefore described for the transducer 28, the photodetectors 271 and 272 of the interferometer 27 provide phase displaced light fringe signals. The photodetectors 271 and 272 are respectively connected by associated conductors to transmit the directional indicating fringe signals to Schmitt triggers 273 and 274 that are, in turn, connected via respectively associated conductors 277 and 278 to energize a synchronizer 280. From the synchronizer 280, the phase differentiated signals are transmitted via output conductors 283 and 284 to actuate a counter 285 adapted to continuously indicate the total number of fringe counting signals comprising the vector measuring beam RA to indicate the distance between the pivot axes. Depending upon the sequence in which the conductors 283 or 284 are being energized to transmit signals by the synchronizer 280, the counter 285 is operative to increment or decrement the pulsating RA vector measuring signal. From the counter 285, output control signals indicating the value of the vector measuring beam are transmitted via output conductors 287 and 288 connected to supply input signals to a controller 289. The controller 289, in turn, is operative to continuously square the value of the RA signal transmitted thereto from the RA counter 285. Successive RA squared signals from the controller 289 are transmitted via an output conductor 290 to the summing register 263.

In the event the RA vector beam is increasing in rectilinear length, the synchronizer 280 operates to provide pulsating output signals to increment the value of the RA signal within the counter 285. Consequently, an RA signal of increased value, or increasing value, is transmitted along the positive conductor 288 to effect an increase in the (RA) squared signal effected by the controller 289.

The summing register 263 operates to add the total value of the (RA) squared signal from the input conductor 290 to the variable pulse signal received from the control 259 via the input conductor 260. The combined signal from the summing register 263 is then transmitted via an output conductor 293 to a controller 294 operative to continuously extract the square root of the combined signals successively submitted thereto. The pulsating values of the successive square root signals from the controller 294 are then transmitted by an output conductor 295 to a summing unit 257 for determining the vertical Y position. In addition to the square root signal from the controller 294, the summing unit 257 receives via the input conductor 256 a fixed pulse signal having the value (−B) as indicated for the vertical offset position of the G pivot axis in FIG. 5A.

As hereinbefore explained, it is not deemed necessary to show in detail the various shift registers, gating circuits or other control elements required to trigger the numerical control system to actuate the servomotors for effecting movements according to predetermined input command signals. The control circuit schematically illustrated in block diagram form in FIG. 7 is deemed fully adequate to explain the interrelationships effected by the principal shift registers and control elements, as well as the logic relationships necessary to effectively translate the separate vector measurements of spindle position into corresponding orthogonal measurements of spindle position. Further, the block diagram of FIG. 7 together with the diagrammatic views of FIGS. 5 and 5A illustrate the method of translating vector measurements into orthogonal measurements and utilizing the resulting orthogonal measurements as feedback error control signals for controlling movement of the spindle along a horizontal X axis and a Y axis in response to numerically commanded power translators to effect such movements.

Attention is directed particularly to the fixed offset measurements of the G and H pivot axes for the outer ends of the respective interferometers as shown in FIG. 5A. To facilitate the description, the two fixed offset measurements respectively associated with each pivot axis are represented by alphabetic letters instead of numerical values. As hereinbefore explained, the horizontal (−A) offset and the vertical (−B) offset for the G pivot axis associated with the RA vector measuring beam can be directly expressed in numerical values, each of which can be translated into an actual number of the value of total light fringes equal to the respective (−A) and (−B) offsets. In like manner, the horizontal (−C) offset and the vertical (−D) offset for the H pivot axis associated with the RB vector measuring beam can be converted into numerical values which, in turn, can be translated into a total number of light fringes equal to the exact offset positions. Although not essential, the respective alphabetic letter values are usually represented in terms of the total value of the light fringes for each of the rectilinear offsets to provide respective pulse trains having a predetermined fixed value that are completely compatible with the value of the total number of light fringes generated in other portions of the control circuit.

At the very outset, therefore, the pulse dividers 243, 253, 235 and 254 are respectively connected to provide fixed pulse outputs schematically illustrated as having outputs which correspond to the various offsets illustrated in FIG. 5A. For purposes of illustration, it will now be assumed that the tool spindle 50 has been bodily moved to a zero inch position along both the horizontal X axis and the vertical Y axis. It will likewise be assumed that the 250 KC. clock generator 246 has been activated to supply the appropriate values of fixed pulses to the respective pulse dividers 243, 253, 235 and 254. With the transducers 27 and 28, as well as the X and Y axis servomotors 43 and 59 also energized, control signals are immediately available from the X and Y axis position registers 189 and 190 to activate the respective servo error controllers 186 and 178 for dynamically retaining the servomotors 43 and 59 in the zero axis position.

With these conditions existing, a control tape in the numerical control system 166 is operated to transmit a 5 inch Y position command signal to the tape command register 175 and a like 5 inch X command signal to the tape command register 183. With the separate 5 inch positional command signals transmitted to the command registers 175 and 183, the tape within the system 166 is advanced to read the end of block signal to immediately activate the entire control system for effecting the separate 5 inch X and Y axis movements. With the system thus triggered for effecting spindle movement, the selected 5 inch input commands are transmitted to the respective Y and X axis servo error controls 178 and 186 for providing output signals along conductors 196 and 193 to energize the servomotors 59 and 43 to move the spindle in the required direction. As this occurs, spindle movement along the X and Y axes actuates the vector measuring transducers 27 and 28 to provide changing direction controlling output signal to the circuit. The changing vector measurements from the transducers are combined both with fixed pulse signals from the various pulse dividers activated by the clock generator 246, as well as variable pulse signals concomitantly generated by extensible movement of the opposite interferometer. The resulting continuously modified X and Y control signals are transmitted from the respective registers 190 and 189 along conductors 195 and 192 for supplying position indicating signals to the Y control 178 and the X control 186 respectively In FIG. 8 there is illustrated a simplified form of vector measuring control system that obviates the necessity for providing one controller to continuously square the vector measured distance, and a separate cooperating controller operative to extract the square root of a summed input that includes the square of the vector measurement. As previously described in connection with FIG. 7, separate controllers 218 and 289 are respectively connected to continuously square the vector measurements from counters 212 and 285. In addition, the control system schematically illustrated in FIG. 7 requires additional controllers 228 and 294 respectively operative to extract the square root of the separately summed inputs for the X and Y positions respectively.

The simplified control system illustrated in FIG. 8 is provided with certain control elements identical to those illustrated in FIG. 7 and identified by like reference numerals. For example, the numerical control system 166 is connected to provide command signals via output conduits 167 and 171 respectively connected to actuate the spindle rate control 169 and the Z axis command register 172. In like manner, prior to and end of block signal, control commands are transmitted by conductors 174 and 182 respectively connected to actuate a Y axis command register 175 and an X axis command register 183. Furthermore, the clock oscillator 246 is connected to generate signals for energizing and providing uniform or fixed pulse signals to pulse dividers 235, 254, 253 and 243, all of which provide signals of predetermined value and respectively corresponding to the fixed offsets of the pivot axes described in connection with FIG. 5A.

The simplified and faster operation of the control circuit illustrated in FIG. 8 is predicated upon the fact that it is possible to directly add the increments of the successive square roots of successively squared numbers. With vector measurements being effected by laser interferometers, the value of each pulse for effecting an incremental change in position is equal to one light fringe or 6¼ millionths of an inch. As already explained, the RB counter 212 and the RA counter 285 in FIGS. 7 and 8 are respectively disposed to express the rectilinear measurement of the distance between the spindle pivot axis and the G and H pivot axes in terms of total pulses comprising the RA and RB beams plus the offsets at opposite ends of the beams. As explained in FIG. 7, the total value of RB signal pulses in the counter 212 is incremented or decremented in accordance with the direction of movement along the X axis and the order of phase differentiated input pulses via conductors 209 and 210. In a similar manner, the total number of RA signal pulses in the counter 285 is incremented or decremented in accordance with the direction of movement along the Y axis. With the position indicating counters 212 and 285 thus activated to indicate the respective positions of movement along the X and Y axes, the control system schematically illustrated in FIG. 8 is operative to provide light fringes indicating positioning measurements corresponding to the orthogonal movements of the tool spindle along the X and Y axes.

Instead of performing the separate functions of first squaring and then extracting the square roots of position determining signals, the control circuit illustrated in FIG. 8 is provided with simplified controllers operative to directly add the incremental differences between successive summed inputs including successively squared signals. This arrangement simplifies and greatly accelerates the computational operations required to accurately change the vector measurements into orthogonal position controlling feedback measurements. To illustrate the fact that similar controllers are utilized in different cooperating portions of the entire system, the letter N will be used to illustrate the value of RA, RB, or these values with offsets such as (Y−A), (X−B) et cetera.

With these conditions existing, it will be further assumed that:

$$N^2 = N^2$$
$$(N+1)^2 = N^2 + 2N + 1$$

Thus, if $N$ increases by one pulse of by one unit, then $N^2$ increases by the incremental or pulsed value of $(2N+1)$ units.

In a similar manner, with $$N^2 = N^2$$
$$(N-1)^2 = N^2 - 2N + 1$$

Therefore, if $N$ decreases by one unit or by one pulse, then $N^2$ decreases by the incremental or pulsed value of $(-2N+1)$ units.

These relationships can be further illustrated by the following numerical values substituted for the letter values as follows:

| N | $N^2$ | Incremental difference between squared values | |
|---|---|---|---|
| 7 | 49 | | |
| 8 | 64 | 15 | (2×7+1) |
| 9 | 81 | 17 | (2×8+1) |
| 10 | 100 | 19 | (2×9+1) |
| 11 | 121 | 21 | (2×10+1) |
| 10 | 100 | 21 | (2×11−1) |
| 9 | 81 | 19 | (2×10−1) |
| 8 | 64 | 17 | (2×9−1) |
| 7 | 49 | 15 | (2×8−1) |
| 6 | 36 | 13 | (2×7−1) |
| 5 | 25 | 11 | (2×6−1) |

Thus, depending upon the direction of X axis movement, the RB vector measuring counter 212 provides a single ± output pulse along a conductor 302 connected to actuate an incremental squaring pulse control 303. As hereinbefore described with reference to incrementing or decrementing the value of $N^2$, the squaring pulse control 303 is operatively disposed to continuously perform the operations of $(\pm 2RB+1)$, as required by the input signal; and, transmits the resulting signal along a conductor 306 to actuate a summing register 307 comprising the (X) error accumulator. In addition to the incremental squaring pulse control signal along conductor 306, the summing register 307 is connected to receive two other modifying control signals via input conductors 309 and 310 respectively.

As illustrated in FIG. 8, one modifying signal is provided by an adder control 312 which is connected to receive input signals from two sources and combine these signals to provide the resulting output signal having a value of $\pm 2(X+A)+1$ which is transmitted along the conductor 309 to the summing register 307. In a similar manner, another adder control 314 is connected to receive input signals from two sources and add these signals to provide a resulting signal having a value $\pm 2(Y++1$ for transmission along the conductor 310 to the summing register 307. The separate total signal pulses respectively supplied along input conductors 306, 309 and 310 are combined by the summing register 307 which is connected to provide resultant direction indicating output signals along output conductors 316 and 317 which are connected to actuate the X position register 189 for indicating the horizontal position of the tool spindle. Conductors 316 and 317 are respectively connected by conductors 318 and 319 to provi'e direction indicating, positional signals to an X axis error counter 322. The X axis error counter 322 is connected via conductors 324 and 325 to receive signals from the X axis command register 183 which is adapted to receive position controlling input commands from the numerical control system 166, as hereinbefore explained. Depending upon the difference between the directional indicating positional feedback commands via conductors 318 and 319, and the commanded position via conductors 324 and 325, the X axis error counter 322 provides a direction controlling error signal via output conductor 327 for actuating the X axis servocontrol 162 to operate the X axis servomotor 43 for effecting X axis movement to the selected position.

In a similar manner, the RA vector measuring counter 285 provides a signal along a conductor 328 to activate an incremental squaring pulse control 329. Depending upon the vertical direction of movement of the spindle along the Y axis, the squaring pulse control 329 provides an output signal having a value $\pm(2RA+1)$ which is transmitted along a conductor 332 to actuate a summing register 333 which is connected to receive modifying signals along input conductors 335 and 336. A first adder control 338 is connected to receive two input signals and combine the separate inputs to produce a signal having a value $\pm 2(X+C)+1$ which is transmitted along the output conductor 335 to provide one modifying input signal to the summing register 333. A second adder control 340 is likewise connected to receive two separate input signals and combine those inputs into a signal having a value of $\pm 2(Y+D)+1$ which is transmitted along conductor 336 to provide a second modifying signal to the summing register 333. The summing register 333 is operatively disposed to combine the three separate input signals received along conductors 332, 335 and 336 to produce an output signal along conductors 344 and 345 which are connected to actuate the Y axis position register 190. In addition, the conductors 344 and 345 are respectively connected via conductors 346 and 347 to provide position indicating signals to a Y axis error counter 350. The Y axis error counter is likewise connected via conductors 352 and 353 to receive Y axis numerical command signals from the Y axis command register 175. Consequently, the Y axis error counter 350 provides direction controlling output error control signals along a conductor 355 to operate the Y axis servocontrol 178 for effecting directionally controlled movement of the Y axis servomotor 59 for moving the spindlehead to the selected position.

To provide the properly coordinated modulating signals to the X summing register 307 and Y summing register 333, pulsating signals are originated by the position registers 189 and 190, as well as the fixed control dividers 235, 243, 253 and 254. The Y position vertical register 190 is connected to provide an output signal along conductor 360 to activate an incremental squaring pulse control 361. The squaring pulse control 361 is provided with a control circuit adapted to receive the pulsating Y position indicating signal from conductor 360 and convert the value of this signal to $\pm 2Y+1$ that is transmitted along an output conductor 362 connected to a common line 364. The common line 364 is connected at its opposite ends to transmit the pulse control signal $\pm 2Y+1$ to the respective adders 314 and 340.

In a similar manner, the X position register 189 is connected to transmit a signal continuously equal to the value of the X position via a conductor 372 to an incremental squaring pulse control 373. The X position signal from the conductor 372 is converted by the squaring pulse control 373 to a value $\pm 2X+1$ which, in turn, is transmitted along an output conductor 376 to a common conductor 377. Thus, the conductor 377 is connected to transmit a signal having a value of $\pm 2X+1$ to the respective adders 312 and 338.

To complete the separate modifying signals to the summing register 333, the respective pulse controls 254 and 235 are connected to provide an origin of fixed or nonvarying signal pulses of predetermined value for the adders 340 and 338. To accomplish this, the signal pulse input $(-D)$ from the pulse control 254 is connected via conductor 367 to a control circuit 368 operative to translate the input signal into a pulsating signal having a fixed value of $\pm 2D$. The resulting signal from the control circuit 368 is transmitted via a conductor 369 to the adder 340 where it is combined with the incremental pulse to signal from the common input conductor 364. Consequently, the adder 340 provides a signal having a value $\pm 2(Y++1$ constituting a variable pulsating signal transmitted along conductor 336 to the summing register 333. In a similar manner, the pulse control 235 is connected to transmit a fixed pulse output signal having a value of $(-C)$ light fringes via a conductor 380 to a control circuit 381. The control circuit 381 is operative to convert the fixed pulse $(-C)$ signal to a fixed pulse signal having a value of $\pm 2C$ which is transmitted along conductor 382 to the adder 338 for combining with the variable pulse signals supplied thereto along the conductor 377. The control circuit within the adder 338 is operative to convert the fixed and variable pulse signals supplied thereto into a variable signal having a value $\pm 2(X+C)+1$ transmitted along conductor 335 to the summing register 333. As hereinbefore explained, the summing register 333 is operative to combine the input signals transmitted thereto along conductors 332, 335 and 336 to provide the Y axis error control signals along output conductors 344 and 345.

In a similar manner, the pulse controls 243 and 253 operate as a source of fixed pulse signals for the adders 312 and 314 respectively. From the pulse control 243, a fixed pulse signal having a $(-A)$ value is transmitted along conductor 385 to a control 386 that is operatively disposed to convert the input signal to a $\pm 2A$ value. The resulting $\pm 2A$ signal from the control 386 is transmitted along conductor 387 to the adder 312 which operates to combine the fixed input signal with a variable pulse signal from the conductor 377. The adder 312 is thus operative to provide a combined output signal having a value $\pm 2(X++1$ for transmission along the conductor 309 to the summing register 307. At the same time, the pulse control 253 provides a fixed pulse signal output $(-B)$ along conductor 390 to a control 391 adapted to convert the fixed input signal to a signal having a $\pm 2B$ value. From the control 391, the $\pm 2B$ fixed pulse signal is transmitted along conductor 392 to the adder 314 for combining with the variable pulsed input signal supplied thereto via the conductor 364. The adder 314 operates to provide a fixed pulse signal having a value of $\pm 2(Y++1$ along the output conductor 310 to the summing register 307. As hereinbefore explained, the summing register 307 operates to combine the three separate input signals respectively transmitted thereto via conductors 306, 309 and 310 to provide an accurate X axis position indicating signal along output conductors 316 and 317.

From the foregoing description of the circuit diagrammatically illustrated in FIG. 8, it will be apparent that a greatly improved arrangement has been provided for simplifying the square and square root process. To accomplish this, a simplified circuit is arranged to work directly on small differences between the numbers to be squared, or from which the square root is to be extracted. Actually, the circuit illustrated in FIG. 8 completely obviates the functions of extracting the square root and greatly increases the computational speed of operation. The block diagram in FIG. 8 operates in a manner to diminish the X position if QA exceeds 0 and to increase the X position if QA is negative. In a similar manner, the Y position is increased or decreased by one unit (pulse or fringe) at a time in order to adjust QB as close to 0 as possible. Inasmuch as both of these equations are being adjusted continuously and affect one another, the computations must take place quickly with the resulting values of the X and Y positions being continuously available to supply the required feedback information for comparison with X and Y commands from the tape.

It is preferable that the vector measuring interferometers 27 and 28, FIG. 1, be reasonably close to a perpendicular relationship to one another. However, the degree of perpendicular relationship will obviously change during operation. For example, leftward and downward movement of the spindle head 48 from the position shown in FIG. 1 will increase the perpendicular relationship between the vector measuring interferometers 27 and 28. Maintaining a reasonably close perpendicular relationship between the interferometers improves the degree of resolution as movement is effected.

To facilitate the description, as shown in FIG. 1, the vector measuring transducers 27 and 28 have been illustrated as being in predetermined angular relationship to one another as well as to the perpendicular X and Y axes of movement of the tool support. In similar manner, as shown in FIGS. 5 and 7, the vector measuring beams RA and RB are schematically illustrated as being in similar predetermined angular relationship between the common spindle pivot axes and the angularly spaced apart pivot axes G and H of the frame or base 21. It is emphasized that the particular angular vector relationships shown and described are illustrative only and have been selected to facilitate and simplify explaining the invention.

It is further emphasized that in a preferred embodiment of the invention, the vector measuring transducers are maintained as nearly as possible perpendicular to one another as well as being simultaneously maintained at angles of 45° with respect to the respective perpendicular X and Y axes of tool support movement. To achieve the preferred vector relationships described for the complete range of bodily spindle movement, it will be apparent the respective frame pivot axes are maintained at their maximum practical equidistant spaced apart positions relative to said common spindle pivot axes. With these described conditions maintained, the respective light fringes will be in the most closely practical symmetrical relationship irrespective of the lateral bodily movement of the tool support within its permissible range of movement.

Although the exemplary embodiments have been described in considerable detail in order to fully disclose practical operative apparatus incorporating the invention, it is to be understood that the particular structures shown and described are illustrative only, and that the various characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool having a positioning control system;
   a frame;
   a first member carried by said frame for selective rectilinear movement therealong;
   a second member movably carried by said first member for selective movement along an axis perpendicular to the axis of movement of said first member; a pair of rectilineal measuring transducers pivotally interconnected between said second member and spaced-apart portions s of said frame for respectively measuring the distance between said second member and spaced apart portions of said frame;
   separate triangulation position measuring means simultaneously responsive to said transducers for respectively indicating the positional movement of said first member along said frame and the perpendicular movement of said second member along said first member; and
   separate power translators respectively interconnected between said frame and said first member as well as between said first member and said second member; said translators respectively connected to be coordinately actuated by said separate triangulation measuring means.

2. In a machine tool according to claim 1 in which said measuring transducers comprise separate and individually extensible laser interferometers respectively adapted to measure the distance between said second member and said frame.

3. In a machine tool according to claim 1, including separate telescoping tubular supports respectively operative to protect and guidably constrain said respective transducers during measuring movement.

4. In a machine tool having a frame;
   a rotatable tool spindle movably guided by said frame for rectilinear movement in mutually perpendicular planes, each perpendicular to the rotational axis of said spindle;
   a first and a second power drive respectively connected to effect selective movement of said spindle along its perpendicular axes of movement;
   a first and a second lineal transducer each pivotally connected at its inner end to said spindle and extending outwardly in angularly diverging directions in a plane perpendicular to the axis of said spindle, said transducers being pivotally secured at their opposite outer ends to spaced apart portions of said frame;
   a first and a second counter respectively connected to be actuated by said first and second transducers to indicate the respective rectilinear angular positions of said spindle relative to said frame;
   a first and a second accumulator respectively actuated by said first and second counters operative to provide output feedback control signals respectively representing the separate perpendicular axes of movement;
   a first modulator connected to transmit signals from said second accumulator to predeterminately modify the feedback signals from said first accumulator;
   a second modulator connected to transmit signals from said first accumulator to predeterminately modify the positional feedback signals from said second accumulator; and,
   a numerical control system adapted to selectively actuate said power drives for effecting corresponding positionally controlled movement of said tool support along its perpendicular paths of movement to predetermined positions as determined by the respectively modulated perpendicular feedback control signals from said first and second accumulators.

5. In a machine tool having a rotatable tool support carried for rectilinear movement in mutually perpendicular planes;
   a frame disposed to guide said tool support for selective rectilinear movement in perpendicular planes both perpendicular to the rotational axis of said tool support;
   power drives respectively operable to selectively move said tool support along its perpendicular paths of movement;
   a pair of separate lineal measuring transducers each pivotally connected at one end to said tool support and each extending in angularly diverging directions and in planes perpendicular to the axis thereof, said transducers extending from said tool support in angular directions relative to the perpendicular paths of movement thereof and being pivotally secured at their opposite outer ends to spaced apart portions of said frame;
   a pair of separate counters respectively connected to be activated by said transducers for respectively indicating angular increments of change in the lineal distance measured by each of said transducers upon movement of said tool support in response to either of said power drives;
   a pair of separate squaring controls respectively connected to be actuated by said counters for providing output control signals;
   a first and a second accumulator responsive to output signals from said squaring controls;
   a first control actuated by one of said accumulators and connected to said first power drive for moving said tool support along one axis;
   first modulating means connected to transmit signals from said second accumulator to predeterminately modify the input signals to said first accumulator and said first control actuated thereby;
   a second control actuated by said second accumulator and connected to said second power drive for moving said tool support along the other perpendicular axis; and,
   second modulating means connected to transmit signals from said first signal accumulator to predeterminately modify the input signals to said second accumulator and said second control actuated thereby.

6. In a machine having a frame;
   a support member guided by said frame for selective relative movement along first and second orthogonal axes;
   first and second transducers pivotally interconnected between a common pivot on said support member and a pair of spaced apart pivots on said frame;
   power drive means connected to move said support member along a selected one or both of said orthogonal axes;
   a first controller responsive to coordinate combinations of signals from both of said transducers for providing a first positional signal to indicate orthogonal positional movement of said support member along said first axis and;
   a second controller responsive to different combinations of signals from both of said transducers for providing a second positional signal to indicate coordinate positional movement of said support member along said second transverse axis.

7. In a machine according to claim 6 in which said first and second transducers respectively comprise individually extensible laser interferometers.

8. In a machine tool having
a frame,
a tool support movably guided by said frame for selective movement along perpendicular axes;
first and second power drives respectively operable to move said tool support in a selected one of its perpendicular axes of movement;
a first and second lineal transducer each pivotally connected at one end to said tool support and disposed to extend in angularly diverging directions for pivotal connection at their outer ends to spaced apart portions of said frame;
a first and second signal accumulator respectively connected to be actuated by said first and second transducers for measuring the angular distances between said tool support and the respectively spaced apart portions of said frame;
a first modulator connected to transmit signals from said second accumulator to predeterminately modify said first accumulator for rendering a feedback signal therefrom indicative of the rectilinear position of said tool support along said first perpendicular axis;
a second signal modulator connected to transmit signals from said first accumulator to predeterminately modify said second accumulator for rendering a feedback signal therefrom indicative of the rectilinear position of said tool support along said second perpendicular axis; and,
a numerical control system operative to effect selective actuation of said first and second power drives for moving said tool support to a selected position along said first and second axes as determined by modulated feedback signals from said first and second signal accumulators.

9. In a machine having a frame presenting a pair of spaced apart parallel pivots;
a first member guided by said frame for rectilinear movement along a first axis;
a second member guided by said first member for rectilinear movement along a second axis perpendicular to said first axis;
a tool receiving support carried by said second member presenting a common pivot parallel to said spaced apart pivots presented by said frame;
a first and second measuring transducer each pivotally connected at one end to said common pivot and extending in diverging angular directions relative to said first and second axes for respective pivotal connection at their opposite ends to said spaced apart pivots presented by said frame;
power drive means selectively operable to move said first member along said first axis and said second member along said second axis for moving said tool support to a selected position relative to said frame;
a first controller connected to be simultaneously actuated by a position signal from said first transducer and a predetermined modulating signal from said second transducer in a manner to produce a single first feedback signal for controlling position along said first axis;
a second controller connected to be simultaneously actuated by a principal signal from said second transducer and a predetermined modulating signal from said first transducer in a manner to produce a single second feedback signal for controlling position along said second axis; and,
a data control system connected to effect positionally controlled operation of said power drive means for effecting positionally controlled movement of said tool support according to predetermined positional feedback signals from said first and second controllers.

10. In a machine tool having a support frame;
a first member movably carried by said frame for rectilinear movement along a first axis;
a second member movably carried by said first member for rectilinear movement along a second axis perpendicular to the first axis of movement;
a tool support carried by said second member and extending in a direction perpendicular to the axes of movement of said first and second members,
a first interferometer pivotally connected at one end to said tool support and pivotally connected at its opposite end to a first portion of said frame;
a second interferometer pivotally connected at one end to said tool support and pivotally connected at its opposite end to a portion of said frame spaced from said first portion of said frame;
first and second power drives respectively connected to move said first and second members in their respective perpendicularly disposed axes of movement for positioning said tool support;
first and second position controllers respectively connected to receive signal pulses from said respective angularly disposed first and second interferometers during movement of said tool support in either perpendicular axis of movement;
a first modulator connected to transmit predetermined signal pulses from said second controller to said first controller for so combining with the angular position pulses transmitted thereto as to provide uniform positional control signals for indicating rectilinear movement of said tool support along said first axis;
a second modulator connected to transmit predetermined signal pulses from said first controller to said second controller for so combining with the angular position pulses transmitted thereto as to provide uniform positional control signals for indicating rectilinear movement of said tool support along said second axis; and,
a numerical control system connected to effect selective actuation of said power drives for moving said first and second members to predetermined positions along their respective perpendicular aces of movement as determined by positional control signals from said first and second position controllers.

11. In a machine tool having:
a frame;
a first member slidably carried thereby for rectilinear movement along one axis;
a second member slidably carried by said first member for rectilinear movement along a perpendicular axis;
a tool support carried by said second member and extending in a direction perpendicular to the mutually perpendicular axes of member movement;
separate servodrives respectively connected to move said first and second members along their perpendicular axes of movement;
a numerical control system operative to actuate said servodrives for moving said tool support along its selected perpendicular axes of movement relative to said frame;
first and second rectilinear transducers pivotally connected at one end to said tool support and extending therefrom in angularly diverging directions, said transducers being pivotally secured at their opposite outer ends to spaced apart portions of said frame;
first and second signal accumulators respectively actuated by said first and second transducers upon movement of said tool support along either of its perpendicular axes of movement;
first modulating means connected to transmit signals from said second accumulator to predeterminately modify the signal output from said first accumulator to indicate the proportional incremental movement of said tool support along said first axis;
second modulating means connected to transmit signals from said first accumulator to predeterminately modify the transducer signal input to said second accumulator to indicate the proportional incremental movement of said tool support along said second perpendicular axis; and, a numerical control system connected to effect predetermined actuation of said first and second servo servodrives for controlling perpendicular movement of said tool support to selected positions along said first and second perpendicular axes as determined by modulated positional feedback signals from said first and second accumulators 12. In a machine tool having
a frame;
a tool support guided by said frame for rectilinear movement in first and second mutually transverse axes;
power drive means operative to effect movement of said tool support along a selected axis;
a pair of position measuring transducers each pivotally connected at one end to said tool support and each pivotally connected at their opposite ends to spaced apart portions of said frame;
a first and second measuring control respectively responsive to said transducers for measuring the angular distances between said tool support and said spaced apart portions of said frame;
a first modulator means connected to combine predetermined signals from said second control with the input to said first control for producing a uniform first rectilinear measurement parallel to said first rectilinear axis of movement of said tool support;
second modulating means connected to combine predetermined signals from said first control with the input to said second control for rendering said second control operable to provide a combined rectilinear measurement signal parallel to said second axis of movement of said tool support; and,
a numerical control system operative to provide command data for actuating said power drive means to effect selective rectilinear movement of said tool support along a selected axis as determined by each of the combined positional indicating feedback signals from said first and second measuring controls respectively.

13. In a machine tool having:
a frame;
a tool support guidably carried by said frame for selective rectilinear movement along mutually perpendicular axes;
first and second transducers being respectively and pivotally connected at their outer ends to spaced apart pivot axes presented by said frame and at their inner ends to a common pivot axis carried by said tool support;
first and second power drives connected to effect selective movement of said tool support along each perpendicular axis of movement
a first controller responsive to predeterminately proportioned signals from said transducers for producing feedback signals adapted to control movement of said tool support along its first axis of movement;
a second controller responsive to predeterminately proportioned signals from said transducers for producing feedback signals adapted to control movement of said tool support along its second perpendicular axis of movement; and,
a positional control system operative to effect coordinate control of said power drives for moving said tool support to a selected position as determined by preselected feedback error control signals from said controllers.

14. In a machine tool according to claim 13 wherein said first and second transducers respectively comprise first and second laser interferometers.

15. In a machine tool having a base and a column slidably carried by said base;
a spindlehead slidably carried by said column for movement along an axis perpendicular to the axis of column movement;
first and second servo-driven translators respectively connected to selectively move said column and said spindlehead;
a numerical control system connected to selectively move said translators;
a spindle journaled in said spindle head for rotation about an axis perpendicular to the axes of head and column movement;
a first transducer pivotally connected at one end to said tool spindle and at its opposite end to said base;
a second transducer pivotally connected at one end to said tool spindle and at its opposite end pivotally connected to a spaced apart portion of said base;
first triangulation measuring means actuated by said transducers during movement of said spindle relative to said base to provide a first signal for indicating the positional movement of said column along said base;
second triangulation measuring means actuated by said transducers during bodily movement of said spindle relative to said base to provide a second signal for indicating the positional movement of said spindlehead along said column;
first feedback control means providing an error signal to actuate said first servo translator comprising the difference between positional command signals from said numerical control system and said first triangulation measuring means; and,
second feedback control means providing an error signal to actuate said second servo translator comprising the difference between positional command signals from said numerical control system and said second triangulation measuring means.

16. In a machine tool,
a pair of members carried for relative movement along perpendicular axes;
separate power translators connected to effect rectilinear movement of said members along said respective axes;
a common pivot carried by one of said members relative to a pair of spaced apart pivots carried by the other of said members;
a pair of extensible rectilinear measuring transducers pivotally secured at one end to said common pivot and extending in angularly diverging directions, said measuring transducers being pivotally secured at their opposite outer ends to said spaced apart pivots;
first triangulation measuring means responsive to rectilinear measuring signals from said transducers connected to indicate relative positional movement between said members along one axis of movement and,
second triangulation measuring means responsive to rectilinear measuring signals from said transducers connected to indicate relative positional movement between said members along the other perpendicular axis of movement.